(12) United States Patent
Ikeda et al.

(10) Patent No.: US 10,698,649 B2
(45) Date of Patent: Jun. 30, 2020

(54) OPERATION SWITCH UNIT AND GAME MACHINE

(71) Applicant: OMRON Corporation, Kyoto (JP)

(72) Inventors: Takuma Ikeda, Aichi (JP); Hiroyuki Onitsuka, Gifu (JP); Takahiro Ono, Aichi (JP); Masaaki Sumi, Gifu (JP)

(73) Assignee: Omron Corporation, Kyoto (JP)

( * ) Notice: Subject to any disclaimer, the term of this patent is extended or adjusted under 35 U.S.C. 154(b) by 138 days.

(21) Appl. No.: 16/138,571

(22) Filed: Sep. 21, 2018

(65) Prior Publication Data

US 2019/0114872 A1 Apr. 18, 2019

(30) Foreign Application Priority Data

Oct. 12, 2017 (JP) .................................. 2017-198670

(51) Int. Cl.
*G06F 3/16* (2006.01)
*H04R 1/02* (2006.01)

(52) U.S. Cl.
CPC ................ *G06F 3/16* (2013.01); *G06F 3/167* (2013.01); *H04R 1/02* (2013.01); *H04R 1/028* (2013.01)

(58) Field of Classification Search
CPC ........ G07F 17/32; G07F 17/3209; G06F 3/00; G06F 3/033; G06F 3/16; G06F 3/165; G06F 3/167; H04R 1/00; H04R 1/02; H04R 1/0258; H04R 1/028; H04R 1/32; H04R 1/326; G08G 9/02
See application file for complete search history.

(56) References Cited

U.S. PATENT DOCUMENTS

| | | | |
|---|---|---|---|
| 2006/0284516 A1* | 12/2006 | Shimaoka | H04R 19/04 310/322 |
| 2014/0108934 A1* | 4/2014 | Choi | G06F 3/017 715/727 |
| 2014/0179429 A1 | 6/2014 | Okazaki et al. | |
| 2015/0186109 A1* | 7/2015 | Jarvinen | G06F 3/167 715/728 |
| 2016/0049052 A1* | 2/2016 | Cheatham, III | G08B 7/00 348/14.16 |
| 2019/0069058 A1* | 2/2019 | Lemons | H04R 1/025 |

FOREIGN PATENT DOCUMENTS

JP 2013-009851 A 1/2013

* cited by examiner

*Primary Examiner* — Van T Trieu
(74) *Attorney, Agent, or Firm* — Osha Liang LLP

(57) ABSTRACT

An operation switch unit attached to a game machine includes a spin button that receives an input operation of an operator, an input detector that detects that the input operation of the operator is performed, and a controller that controls a directional speaker such that the directional speaker emits a directional sound, which does not spread uniformly but has directionality, to the operator as a notification that an operation input is performed based on a detection signal from the input detector.

20 Claims, 26 Drawing Sheets

Original sound

Ultrasonic wave

Before depression

After depression

OPERATION SWITCH UNIT AND GAME MACHINE

CROSS-REFERENCE TO RELATED APPLICATION

This application is based on Japanese Patent Application No. 2017-198670 filed with the Japan Patent Office on Oct. 12, 2017, the entire contents of which are incorporated herein by reference.

FIELD

The present invention relates to an operation switch unit attached to a game machine such as a pachinko-slot, a slot machine, and a gaming machine and the game machine.

BACKGROUND

Conventionally, in the game machine such as the pachinko-slot, the slot machine, and the gaming machine, a physical operation switch button is placed on a touch panel, and an operation confirmation sound is output from a speaker of a game machine casing according to an operation input of the operation switch button. Consequently, an operator is notified of the operation from two sides of a tactile sense and an auditory sense. For example, Japanese Unexamined Patent Publication No. 2013-9851 discloses this kind of operation switch unit.

However, in the conventional operation switch unit, the notification by a notification section of the auditory sense is also received by other surrounding players. For this reason, it is difficult to distinguish whether the operation confirmation sound heard by own ears is the own operation confirmation sound or the operation confirmation sound emitted by another person. Thus, a scene in which the player conceives that a bet button is pressed by the operation confirmation sound of the surrounding player although the bet button is not pressed is generated while the player gazes at the game screen.

SUMMARY

The present invention has been made in consideration of the above conventional problems, and an object of the present invention is to provide an operation switch unit and a game machine, in which only a player who plays a game is notified such that the player can hear an operation confirmation sound and another player is prevented from erroneously recognizing the operation confirmation sound.

According to a first aspect of the present invention, in order to solve the problems, an operation switch unit attached to a game machine, the operation switch unit includes: an operation part configured to receive an input operation of an operator; an input detector configured to detect that the input operation of the operator is performed; and a controller configured to control a notification part such that the notification part emits a directional sound to the operator based on a detection signal from the input detector, the notification part emitting the directional sound, which does not spread uniformly but has directionality, as a notification that an operation input is performed.

According to this configuration, when the operator who is the player performs the input operation on the operation part, the input detector detects that the input operation is performed. The notification part is also provided in order to emit the directional sound to the operator as the notification that the operation input is performed. Based on the detection signal from the input detector, the controller controls the notification part such that the notification part emits the directional sound as the notification that the operation input is performed. At this point, the directional sound does not spread uniformly but has directionality, and this directional sound is emitted toward the operator.

Conventionally, an operator who plays an adjacent game machine can hear the operation confirmation sound because the operation confirmation sound indicating that the input operation is performed is radially diffused. On the contrary, this means that the operator hears the operation confirmation sound from the next although the operator does not perform the input operation on the operation part. As a result, it is difficult to distinguish whether the operation confirmation sound heard by the operator is the own operation confirmation sound or the operation confirmation sound emitted by another person. Thus, the scene in which the player conceives that the bet button is pressed by the operation confirmation sound of the surrounding player although the bet button is not pressed is generated while the player gazes at the game screen.

In an aspect of the present invention, the notification part notifies the operator that the operation input is performed by the directional sound. Consequently, only the operator can hear the notification sound of operation confirmation, so that the operator cannot hear the notification sound of the operation confirmation of another person from a neighbor.

As a result, the operator cannot hear the notification sound of the operation confirmation of another person from the neighbor, so that a possibility of erroneous operation is eliminated.

Thus, only a player who plays a game is notified such that the player can hear the operation confirmation sound, which allows the operation switch unit that can prevent another player from erroneously recognizing the operation confirmation sound to be provided by the operation confirmation sound.

In the operation switch unit according to a second aspect of the present invention, preferably the notification part issues an instruction to notify the operator that the operation input is performed by the directional sound using a directional speaker.

The directional speaker radiates the sound only at a narrow angle. Thus, the operator can surely be notified that the operation input is performed by the directional sound.

Preferably the operation switch unit according to a third aspect of the present invention in which the notification part is configured to notify the operator that the operation input is performed, by a method other than a method for notifying the operator by the directional sound, the operation switch unit further includes a notification method selector configured to select whether to notify the operator by the directional sound, by a method other than the directional sound, or by both the directional sound and a method other than the directional sound.

For example, as a method for notifying the operator that the operation input is performed, there is a method by a tactile sense other than a method for directing the directional sound toward the operator.

In an aspect of the present invention, the notification method selector that selects whether to notify the operator by the directional sound, by a method other than the directional sound, or by both the directional sound and a method other than the directional sound is provided. As a result, the operator can select the method preferred by the operator as the operation confirmation using the notification method selector.

Preferably the operation switch unit according to a fourth aspect of the present invention further includes a notification method display that displays a method selected by the notification method selector.

Consequently, the notification method display displays whether to notify the operator by the directional sound, by a method other than the directional method, or by both the directional sound and a method other than the directional sound.

Thus, the operator can confirm the notification method selected by viewing the notification method display, so that the operation confirmation notification can be confirmed from both the auditory sense and the visual sense.

In the operation switch unit according to a fifth aspect of the present invention, preferably the notification method display is provided in the operation part.

Generally, the player often operates the operation part by looking at the reel of the game machine without looking at the operation part. However, sometimes the player wants to visually confirm the operation. In this respect, in an aspect of the present invention, the notification method display is provided in the operation part.

As a result, the operator can confirm the selected notification method by viewing the notification method display provided in the operation part used in the operation input. Thus, the operation switch unit having convenience can be provided.

In the operation switch unit according to a sixth aspect of the present invention, preferably the notification part is provided in the operation part.

Consequently, the notification part is provided integrally with the operation part of the operation switch unit, so that the necessity to seek an appropriate place to which the notification part is attached in the game machine is eliminated. As a result, the notification part is easily installed.

Preferably the operation switch unit according to a seventh aspect of the present invention further includes an operation notification sound selector that selects the directional sound of the notification that the operation input is performed from a plurality of kinds of directional sounds.

Consequently, the directional sound of the notification that the operation input is performed can be selected from the plurality of kinds of directional sounds using the operation notification sound selector. As a result, since the operation notification sound can be set to a directional sound different from others, whether the operation notification sound is the own operation notification sound or the operation notification sound of another person can easily be distinguished.

In the operation switch unit according to an eighth aspect of the present invention, preferably the operation part includes an operation notification sound display that displays a selected operation notification sound.

Consequently, the selected operation notification sound is displayed on the operation notification sound display, so that the operator can confirm the selected operation notification sound.

The operation notification sound display is included in the operation part, so that the operator can confirm the selected operation notification sound by viewing the operation notification sound display provided in the operation part used in the operation input. Thus, the operation switch unit having convenience can be provided.

According to a ninth aspect of the present invention, a game machine includes the operation switch unit.

According to this configuration, the game machine including the operation switch unit that can make the notification such that the operation confirmation sound can be heard only by the player who performs the operation is provided.

An aspect of the present invention produces an effect of providing an operation switch unit and a game machine that can notify only an operating player such that the player can hear an operation confirmation sound.

DETAILED DESCRIPTION

Hereinafter, an embodiment according to an aspect of the present invention will be described with reference to the drawings.

Application Example

Figure 1:
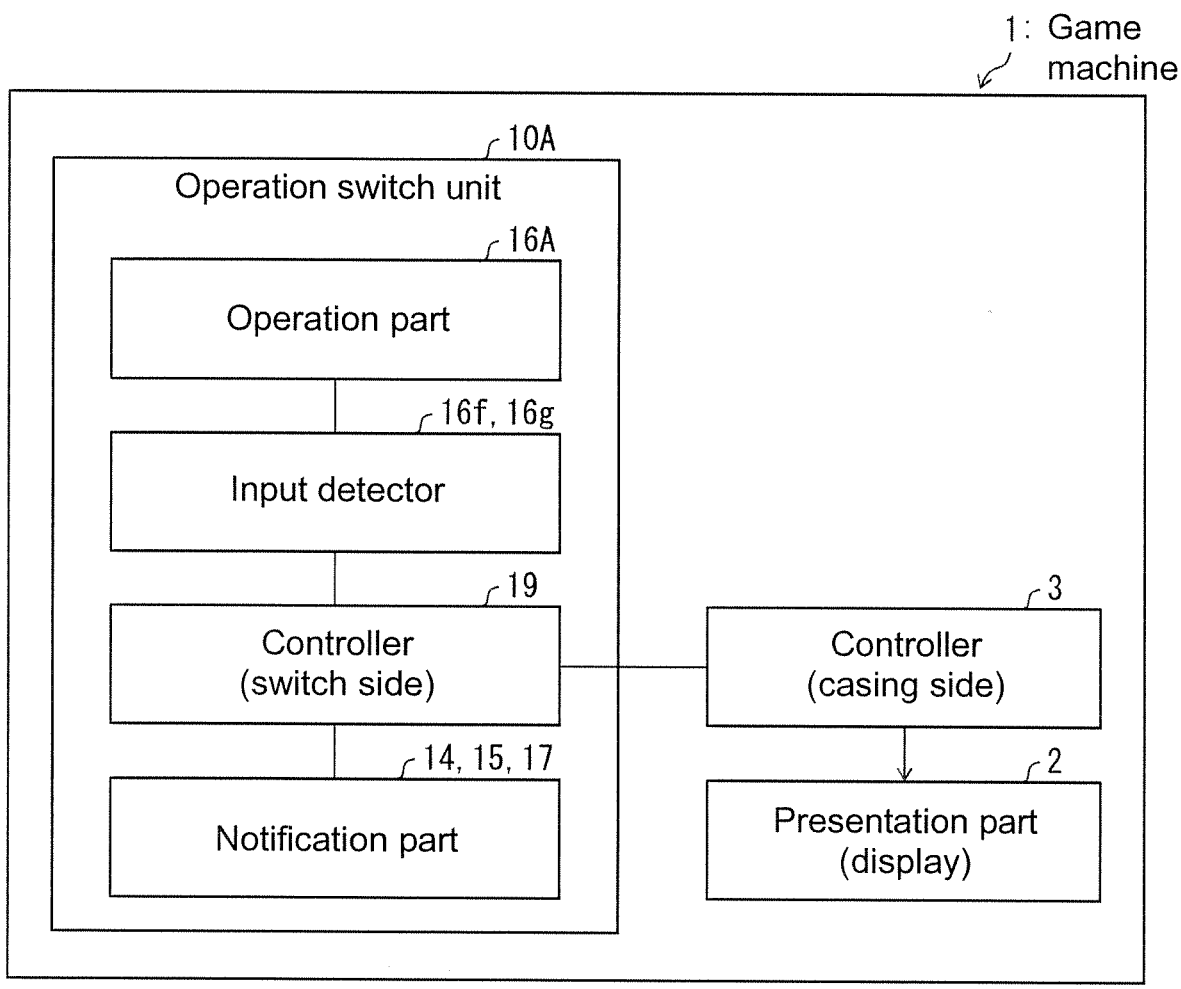
FIG. 1 is a block diagram illustrating an operation switch unit and a game machine according to a first embodiment of the present invention, and illustrating a configuration of the operation switch unit and the game machine.

An example of a scene to which the present invention is applied will be described with reference to FIG. 1. FIG. 1 is a block diagram illustrating an operation switch unit 10A and a game machine 1 according to an aspect of the present invention, and illustrating a configuration of the operation switch unit 10A and the game machine 1.

As illustrated in FIG. 1, the operation switch unit 10A of the aspect of the present invention is attached to the game machine 1. The operation switch unit 10A includes a spin button 16A and a bet button 18 that receive an input operation of an operator, input detectors 16f, 16g that detect that the input operation of the operator is performed, and a controller 19 that controls a directional speaker 14, a voice coil motor 15, and a vibration speaker 17 such that the directional speaker 14, the voice coil motor 15, and the vibration speaker 17 emit a directional sound, which does not spread uniformly but has directionality, to the operator as notification that the input operation is performed based on a detection signal from the input detectors 16f, 16g. The spin button 16A and the bet button 18 function as an operation part. The directional speaker 14 functions as a notification part that emits the directional sound.

According to this configuration, when the operator who is a player performs the input operation on the operation part, the input detectors 16f, 16g detect that the input operation is performed. The directional speaker 14 that emits the directional sound to the operator as the notification that the operation input is performed is provided. Based on the detection signal from the input detectors 16f, 16g, the controller 19 controls the directional speaker 14 such that the directional speaker 14 emits the directional sound as the notification that the operation input is performed. At this point, the directional sound does not spread uniformly but has directionality, and this directional sound is emitted toward the operator.

Consequently, only the operator can hear the notification sound of operation confirmation, so that the operator cannot hear the notification sound of the operation confirmation of another person from a neighbor. As a result, the operator cannot hear the notification sound of the operation confirmation of another person from the neighbor, so that a possibility of erroneous operation is eliminated.

Thus, only a player who plays a game is notified such that the player can hear the operation confirmation sound, which allows the operation switch unit 10A that can prevent another player from erroneously recognizing the operation confirmation sound to be provided by the operation confirmation sound.

Configuration Example

First Embodiment

Hereinafter, a first embodiment according to an aspect of the present invention will be exemplified with reference to FIGS. 1 to 18.

Although an operation switch unit used in a game machine such as what is called a pachinko-slot will be described in the first embodiment, an aspect of the present invention is not limited to the game machine such as the pachinko-slot. That is, the present invention can be applied to any apparatus that receives the operation of the player using the operation switch unit. For example, the present invention is also applicable to slot machines other than a pachinko-slot, a pachinko, a gaming machine for casino, card game machines such as a poker game, or a game machine such as a mahjong game machine.

For example, in the pachinko-slot, when a plurality of reels on which a plurality of kinds of symbols are displayed rotate and stops, a scoring combination is decided by alignment of the plurality of displayed symbols and the kind of the aligned symbols, and a prize is given to the player according to the decided scoring combination and the number of bets (bet number). Setting of the number of bets (bet number) and rotation of the reel are performed by pressing a button. That is, the player decides the number of bets (bet number) by manually pressing the bet button corresponding to the number of set bets (bet number), manually presses the spin button that is a reel rotation start button to fix a win lottery, and starts the rotation of the reel after the winning lottery is fixed, and the rotation of the reel is automatically stopped.

Figure 2A:
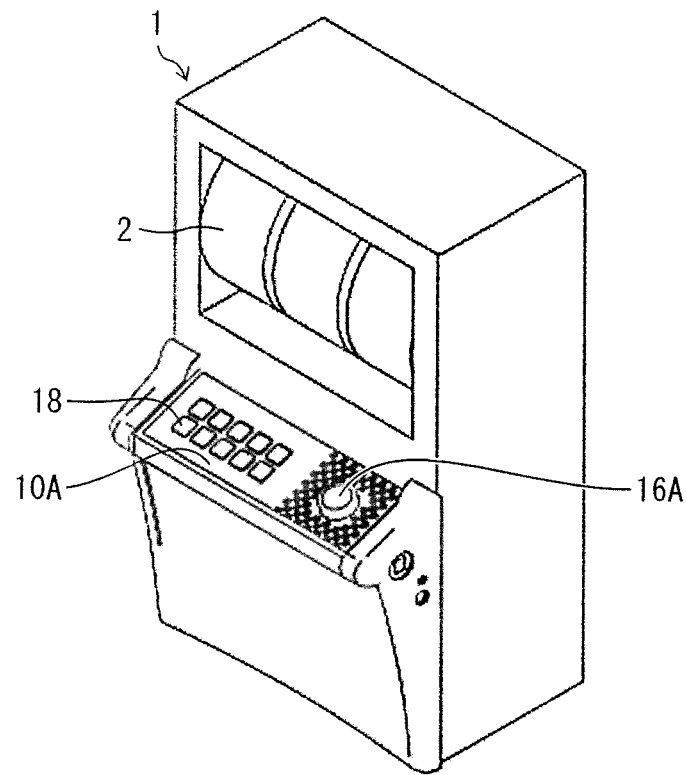
FIG. 2A is a perspective view illustrating the configuration of the game machine.
Figure 2B:
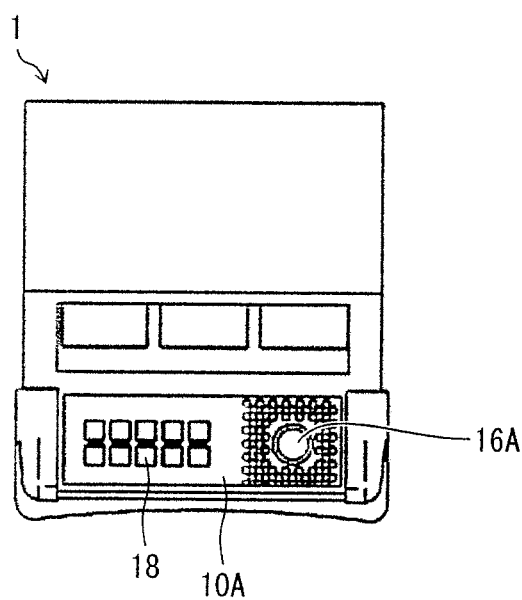
FIG. 2B is a plan view illustrating the configuration of the game machine.

A configuration of the game machine 1 including the operation switch unit 10A of the first embodiment will be described with reference to FIGS. 2A and 2B. FIG. 2A is a perspective view illustrating the configuration of the game machine 1 of the first embodiment. FIG. 2B is a plan view illustrating the configuration of the game machine 1.

As illustrated in FIGS. 2A and 2B, in the game machine 1 of the first embodiment, a display 2 is provided at a position corresponding to player's eyes in an upper portion of a game machine casing. The operation switch unit 10A is provided in a vicinity of a center of the game machine casing on which a hand of the player is placed such that an operation portion is slightly tilted toward a player side.

A plurality of reels on which a plurality of types of symbols are displayed are displayed on the display 2. The player pushes down the spin button 16A of the operation switch unit 10A to start rotation of each reel, and the reel stops automatically under the control of a game machine-side controller 3 (to be described later) of the game machine 1. In the game machine 1, when the reel stops, the scoring combination is decided by alignment of the plurality of symbols displayed on the display 2 and the type of the aligned symbols, and the prize is given to the player according to the scoring combination and the number of bets (bet number). In the first embodiment, each reel is displayed on the display screen such as a liquid crystal screen, but the reel is not necessarily limited to the display on the display screen. Alternatively, the reel may actually be provided.

Figure 3A:
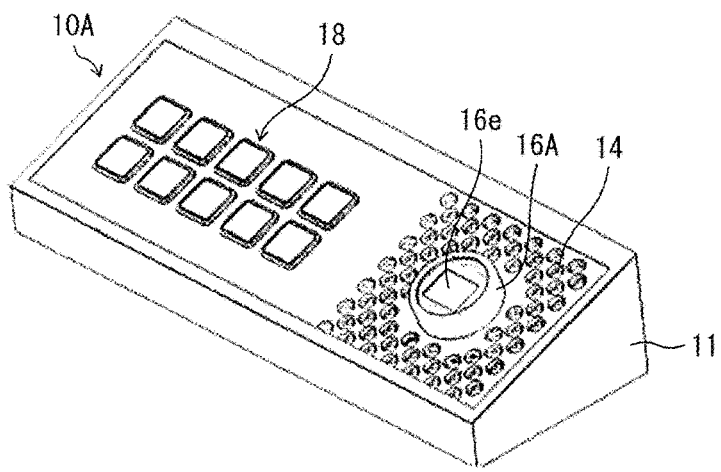
FIG. 3A is a perspective view illustrating the configuration of the operation switch unit when the operation switch unit is viewed from obliquely above.
Figure 3B:
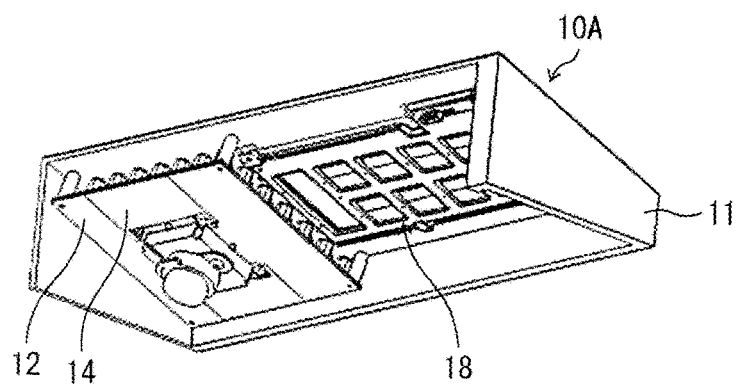
FIG. 3B is a perspective view illustrating the configuration of the operation switch unit when the operation switch unit is viewed from obliquely below.
Figure 3C:
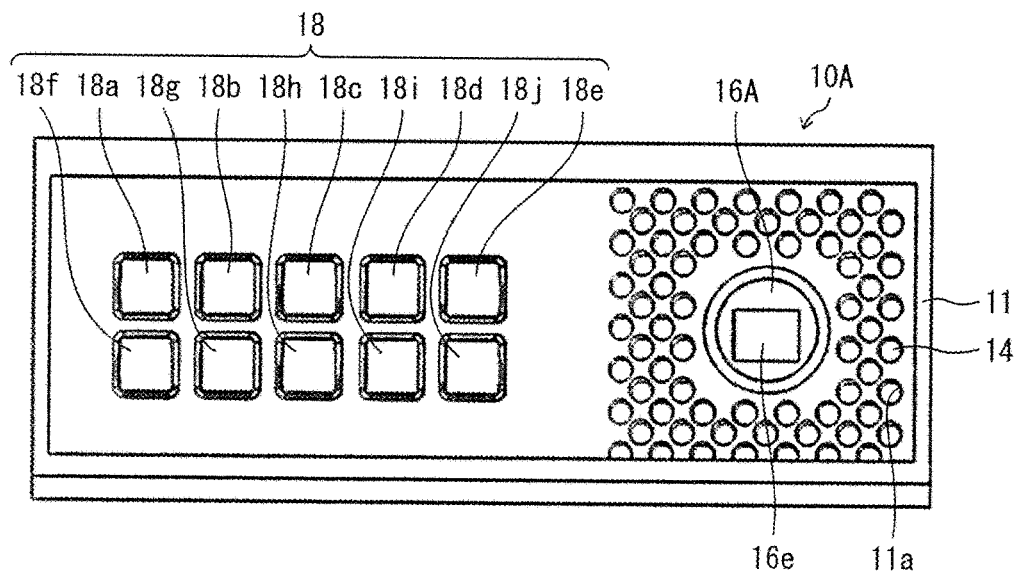
FIG. 3C is a plan view illustrating the configuration of the operation switch unit.

A configuration of the operation switch unit 10A will be described with reference to FIGS. 3A, 3B, and 3C. FIG. 3A is a perspective view illustrating the configuration of the operation switch unit 10A when the operation switch unit 10A is viewed from obliquely above. FIG. 3B is a perspective view illustrating the configuration of the operation switch unit 10A when the operation switch unit 10A is viewed from obliquely below. FIG. 3C is a plan view illustrating the configuration of the operation switch unit 10A.

As illustrated in FIGS. 3A, 3B, and 3C, the operation switch unit 10A includes a switch unit casing 11, which can be separated from the game machine 1 and receives the operation from the player. Specifically, in the operation switch unit 10A, for example, ten bet buttons 18 are provided as a notification method selector on a left side, and one spin button 16A is provided on a right side. Both the bet button 18 and the spin button 16A function as an operation part in an embodiment of the present invention. In the operation switch unit 10A, for example, the bet button 18 receives a setting operation of the number of bets (bet number) when the player plays the game machine 1. The spin button 16A receives the operation such as start of rotation of the reel.

In the first embodiment, for example, ten bet buttons 18a to 18j are provided as the bet button 18. That is, for example, the bet button 18a is used to set the number of bets (bet number) to 1, the bet button 18b is used to set the number of bets (bet number) to 2, and the bet button 18j is used to set the number of bets (bet number) to 10. To set the number of bets (bet number) to 10 means that the number of bets (bet number) corresponding to the number of bets (bet number) for 10 medals is set by pressing the bet button 18j. However, the number of the bet buttons 18 is not limited to ten, but may be fewer or more than ten. Alternatively, the number of the bet buttons 18 may be one. For example, for one bet button 18, the bet button 18 is continuously depressed three times when the number of bets (bet number) is set to 3. Consequently, the number of bets (bet number) for three medals can be set.

At this point, in the first embodiment, each of the ten bet buttons 18 can set the number of bets (bet number) by instantaneous one-time pressing down, and by pressing down the specific bet button 18 for a long time, types of a plurality of operation confirmation notification methods can be selected in order to confirm the operation input (to be described later). A function of selecting the operation confirmation notification method will be described later.

Figure 4A:
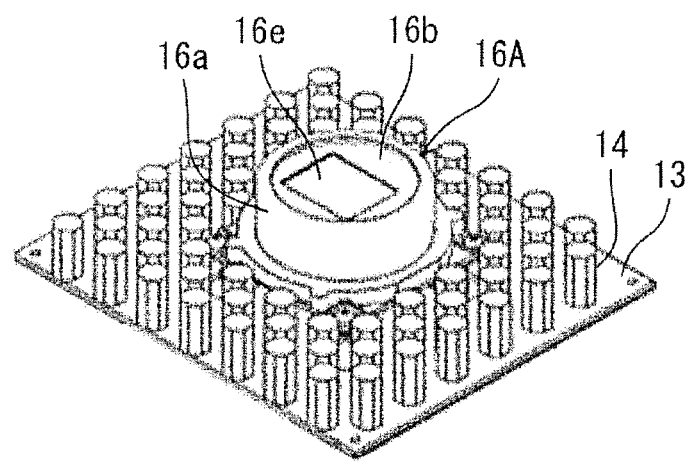
FIG. 4A is a perspective view illustrating the configuration of an operation part and a notification part of the operation switch unit when the operation part and the notification part are viewed from obliquely above.
Figure 4B:
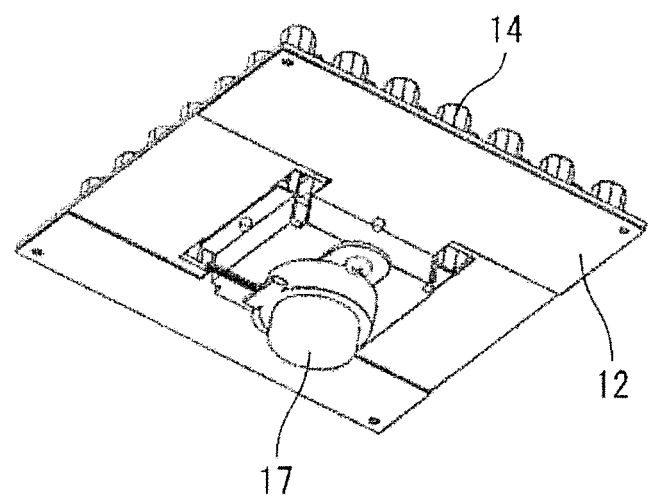
FIG. 4B is a perspective view illustrating the configuration of the operation part and the notification part of the operation switch unit when the operation part and the notification part are viewed from obliquely below.
Figure 4C:
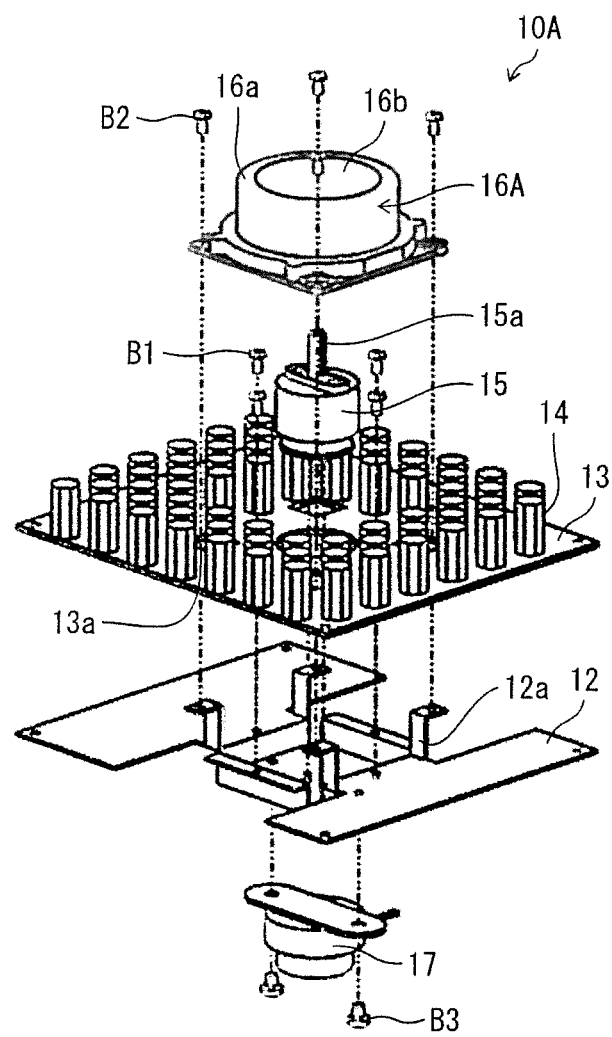
FIG. 4C is an exploded perspective view illustrating the configuration of the operation part and the notification part of the operation switch unit when the operation part and the notification part are viewed from obliquely above.
Figure 5A:
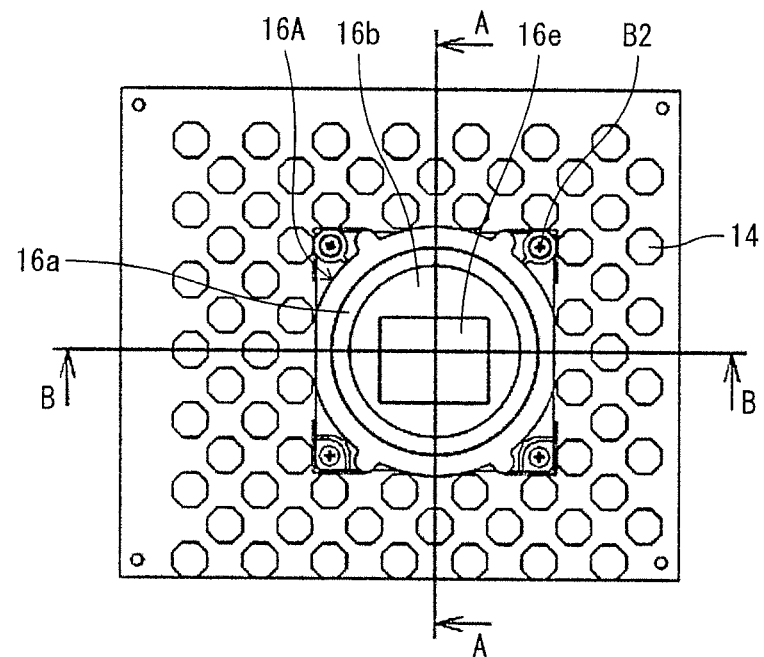
FIG. 5A is a plan view illustrating the configuration of the operation part and the notification part of the operation switch unit.
Figure 5B:
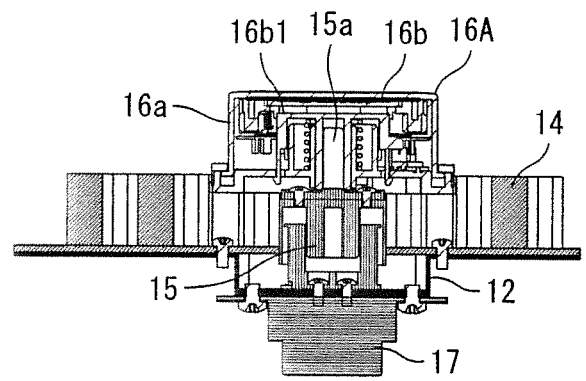
FIG. 5B is a front sectional view illustrating the configuration of the operation part and the notification part of the operation switch unit.
Figure 5C:
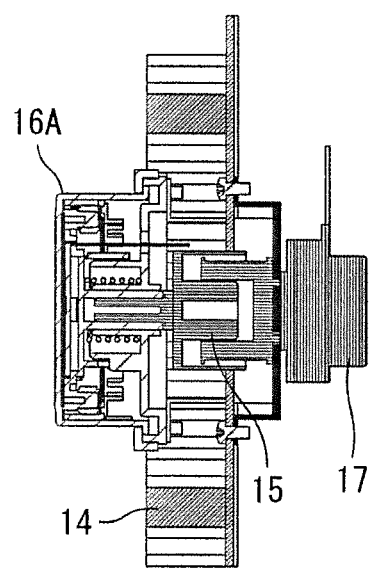
FIG. 5C is a side sectional view illustrating the configuration of the operation part and the notification part of the operation switch unit.
Figure 6A:
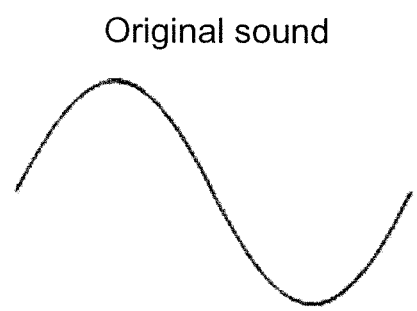
FIG. 6A is a waveform chart illustrating a waveform of an original sound of an operation confirmation sound.
Figure 6B:
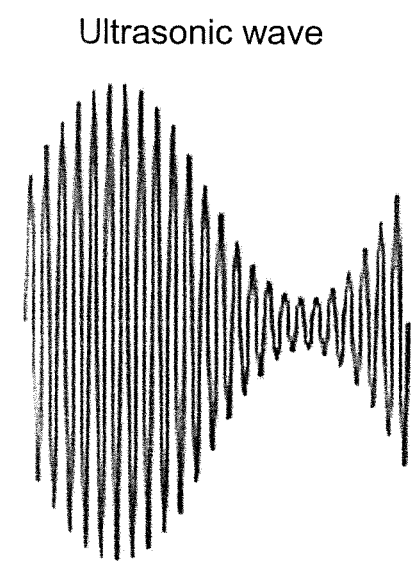
FIG. 6B is a waveform chart illustrating a waveform when an ultrasonic wave is superposed as a carrier wave on the original sound of the operation confirmation sound.
Figure 6C:
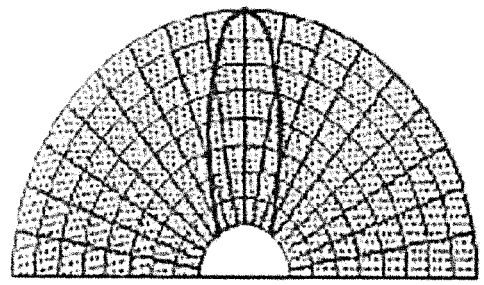
FIG. 6C is a view illustrating a spread when sound is emitted from a directional speaker.
Figure 6D:
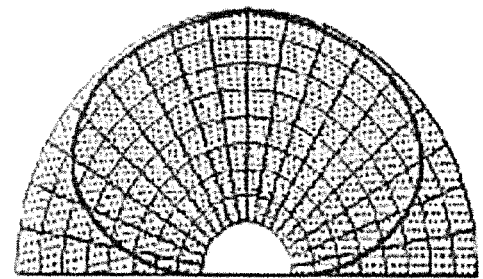
FIG. 6D is a view illustrating the spread when the sound is emitted from a conventional speaker.

A configuration near the spin button 16A of the operation switch unit 10A of the first embodiment will be described with reference to FIGS. 4A, 4B, 4C, 5A, 5B, 5C, 6A, 6B, 6C, and 6D FIG. 4A is a perspective view illustrating the configuration of the spin button 16A and the directional speaker 14 of the operation switch unit 10A when the spin button 16A and the directional speaker 14 are viewed from obliquely above. FIG. 4B is a perspective view illustrating the configuration of the spin button 16A and the directional speaker 14 of the operation switch unit 10A when the spin button 16A and the directional speaker 14 are viewed from obliquely below. FIG. 4C is an exploded perspective view illustrating the configuration of the spin button 16A and the directional speaker 14 of the operation switch unit 10A when the spin button 16A and the directional speaker 14 are viewed from obliquely above. FIG. 5A is a plan view illustrating the configuration of the spin button 16A and the directional speaker 14 of the operation switch unit 10A. FIG. 5B is a front sectional view illustrating the configuration of the spin button 16A and the directional speaker 14 of the operation switch unit 10A. FIG. 5C is a side sectional view illustrating the configuration of the spin button 16A and the directional speaker 14 of the operation switch unit 10A. FIG. 6A is a waveform chart illustrating a waveform of an original sound of an operation confirmation sound. FIG. 6B is a waveform chart illustrating the waveform when an ultrasonic wave is superimposed as a carrier wave on the original sound of the operation confirmation sound. FIG. 6C is a view illustrating spread of sound when the sound is emitted from the directional speaker. FIG. 6D is a view illustrating the spread of the sound when the sound is emitted from a conventional speaker.

As illustrated in FIGS. 4A, 4B, 4C, 5A, 5B, and 5C, in the first embodiment, a lower attaching base 12 including an upright member 12a rising from central four places, an upper attaching base 13 in which a plurality of directional speakers 14 stand together and serve as a plurality of notification parts, and the spin button 16A, which has a bottomed cylindrical shape and is raised by the upright member 12a through four openings 13a of the upper attaching base 13 and fixed by a screw B2, and the voice coil motor 15 as the notification part built in the spin button 16A are provided in this order from a lower side as the configuration near the spin button 16A of the operation switch unit 10A.

The vibration speaker 17 as the notification part is fixed to a lower side of the lower attaching base 12 with a screw B3.

The directional speaker 14 is designed such that a leading end of the directional speaker 14 can be seen from a switch unit casing opening 11a formed in the switch unit casing 11 in FIG. 3C. A plurality of switch unit casing openings 11a are opened into a mesh shape around the spin button 16A. The directional speaker 14 has directivity in the spread of the sound, and in the first embodiment, the directional speaker 14 is constructed with, for example, a parametric speaker in which a plurality of ultrasonic transducers are arranged. As used herein, the directivity is said to be directional when energy radiated by a wave motion such as a radio wave and a sound wave, for example, an antenna or a speaker varies depending on a direction. The case where the energy is uniformly radiated in any direction is referred to as no directivity or omni-directional.

More specifically, when the original sound is constructed with a simple wave as illustrated in FIG. 6A, the original sound is radially diffused and transmitted as illustrated in FIG. 6D. On the other hand, in the directional speaker 14 of the first embodiment constructed with the parametric speaker, the ultrasonic wave is used as the carrier wave for the original sound as illustrated in FIG. 6B, so that the sound spreads only at angles of several degrees as illustrated in FIG. 6C.

As a result, the sound emitted from the directional speaker 14 of the operation switch unit 10A of the first embodiment generates the ultrasonic wave at angles of several degrees, and then proceeds substantially linearly even after the generation. For this reason, the spread of the sound to the surroundings is extremely small. As a result, in the first embodiment, the sound is only heard by the player who plays the game machine 1.

Thus, the directional speaker 14 of the first embodiment has a function as an auditory sense notification section 1 of the operation confirmation auditory sense notification section for notifying the operator that the spin button 16A is operated by the ultrasonic wave.

The directional speaker 14 can make the ultrasonic wave towards the player. As a result, the operator can be notified of the operation input confirmation by the tactile sense by giving the vibration of the spin button 16A to the operator in handling the spin button 16A. In this case, the directional speaker 14 has a function as a tactile sense notification section 1 of the operation confirmation tactile sense notification section.

In the voice coil motor 15, as illustrated in FIGS. 5A, 5B, 5C, and 11A (to be described later), current is passed through a coil (not illustrated) to advance and retract an iron hammer 15a of the voice coil motor 15 toward a metal plate 16b1 provided on a bottom surface of a depression part 16b in the spin button 16A. Consequently, the voice coil motor 15 thrusts up and pushes back the metal plate 16b1 of the depressed depression part 16b. As a result, the voice coil motor 15 gives the impact to the operator's hand when the depression part 16b of the spin button 16A is depressed, so that the voice coil motor 15 of the first embodiment has a function as a tactile sense notification section 2 of the operation confirmation tactile sense notification section. In the voice coil motor 15, the depression part 16b of the spin button 16A can also be vibrated by increasing an advancing and retracting speed of the iron hammer 15a.

The vibration speaker 17 contacts with, for example, the lower attaching base 12 to generate a contact sound consisting of a metal sound such as clink. As a result, the vibration speaker 17 functions as an auditory sense notification section 2 of the operation confirmation auditory sense notification section for causing the operator to confirm that the depressing operation is performed by the contact sound when the depression part 16b of the spin button 16A is depressed. The vibration speaker 17 does not emit a presentation sound while being attached to the game machine casing, but the vibration speaker 17 emits the operation confirmation sound while being provided in the operation switch unit 10A. Thus, the vibration speaker 17 notifies only the operator of the operation confirmation sound.

Figure 7A:
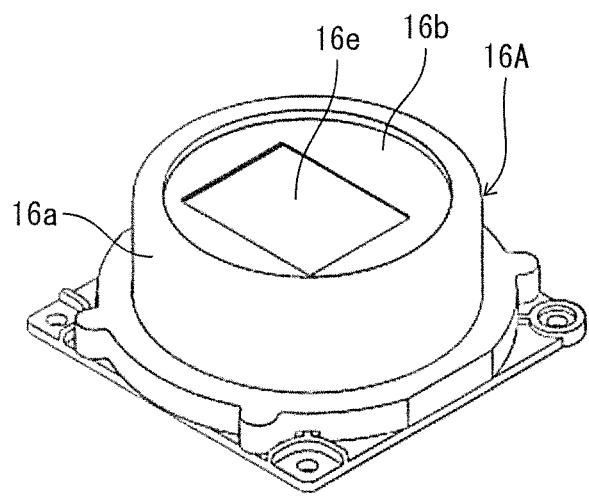
FIG. 7A is a perspective view illustrating the configuration of the operation part of the operation switch unit.
Figure 7B:
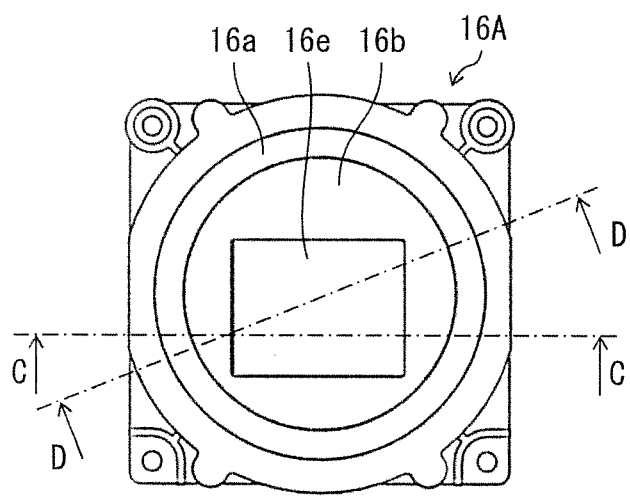
FIG. 7B is a plan view illustrating the configuration of the operation part of the operation switch unit.
Figure 8A:
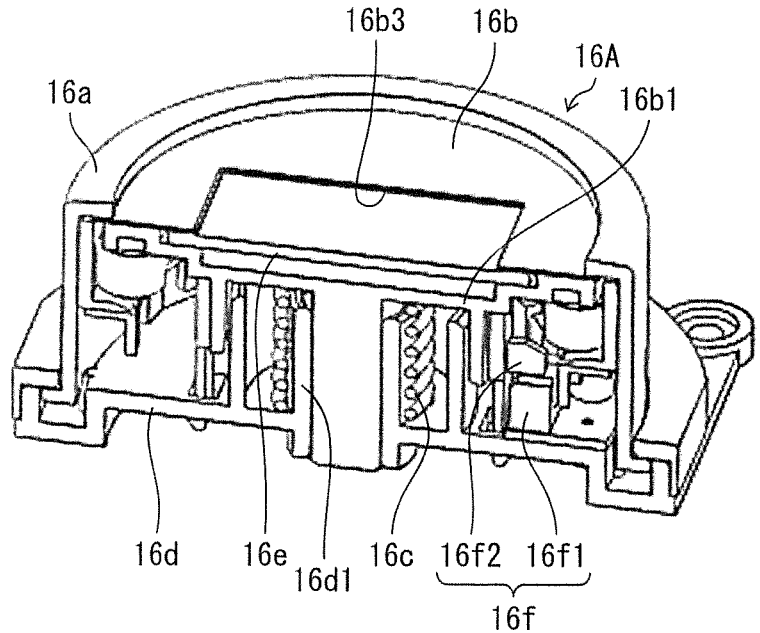
FIG. 8A is perspective sectional view illustrating a section taken along line C-C in FIG. 7B, and illustrating the configuration of the operation part before depression.
Figure 8B:
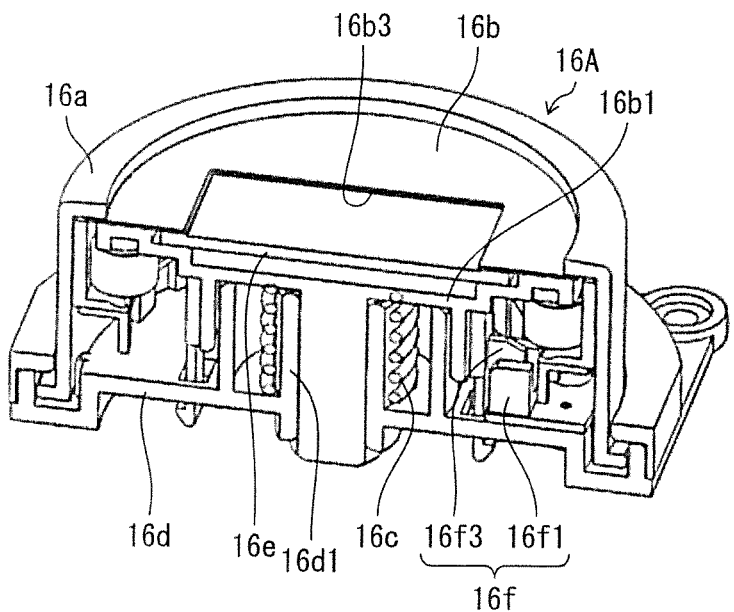
FIG. 8B is a perspective sectional view illustrating the section taken along line C-C in FIG. 7B, and illustrating the configuration of the operation part after the depression.
Figure 9:
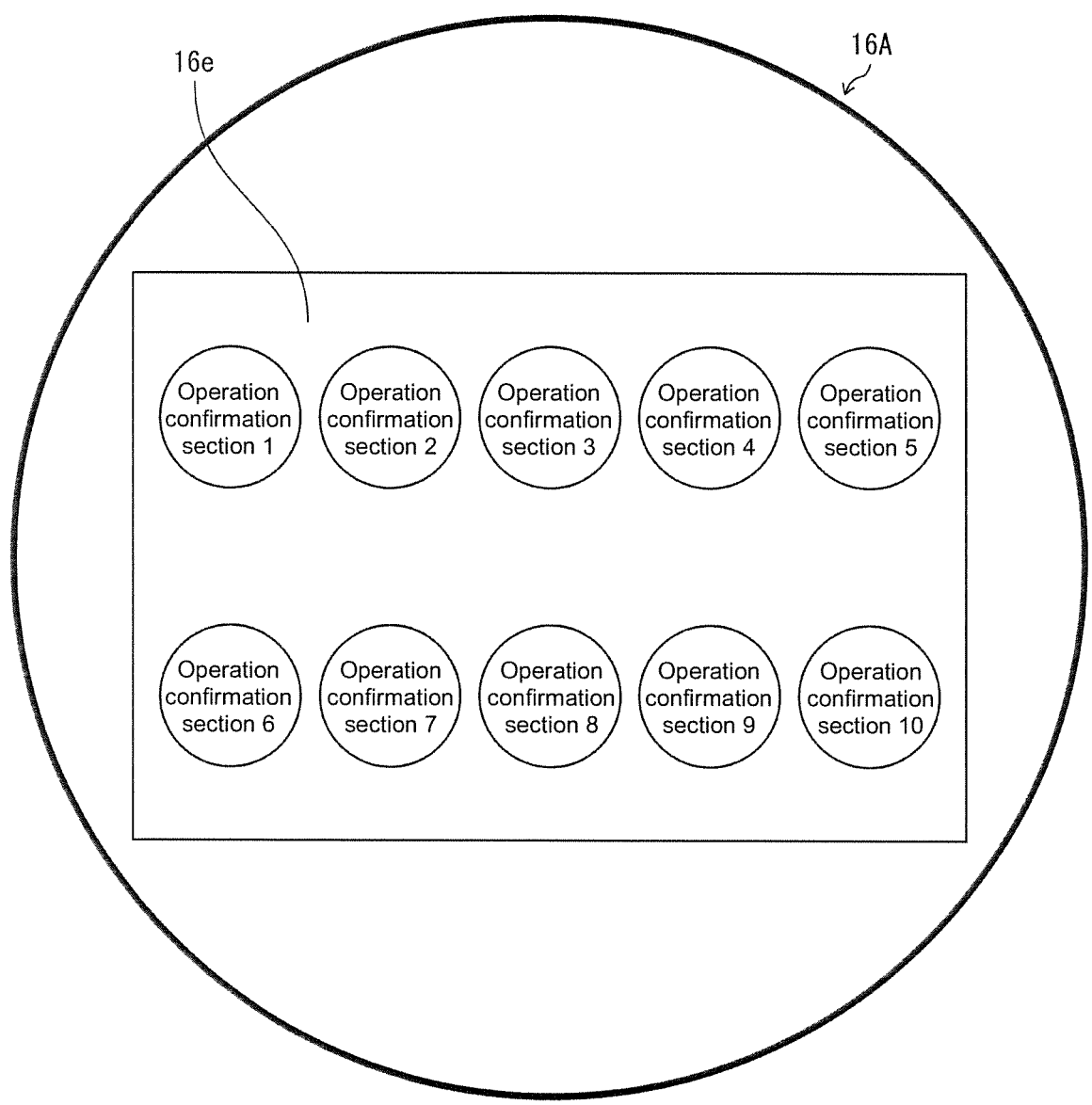
FIG. 9 is a plan view illustrating a display screen of options of an operation confirmation section displayed on a liquid crystal display in the operation part of the operation switch unit.
Figure 10:
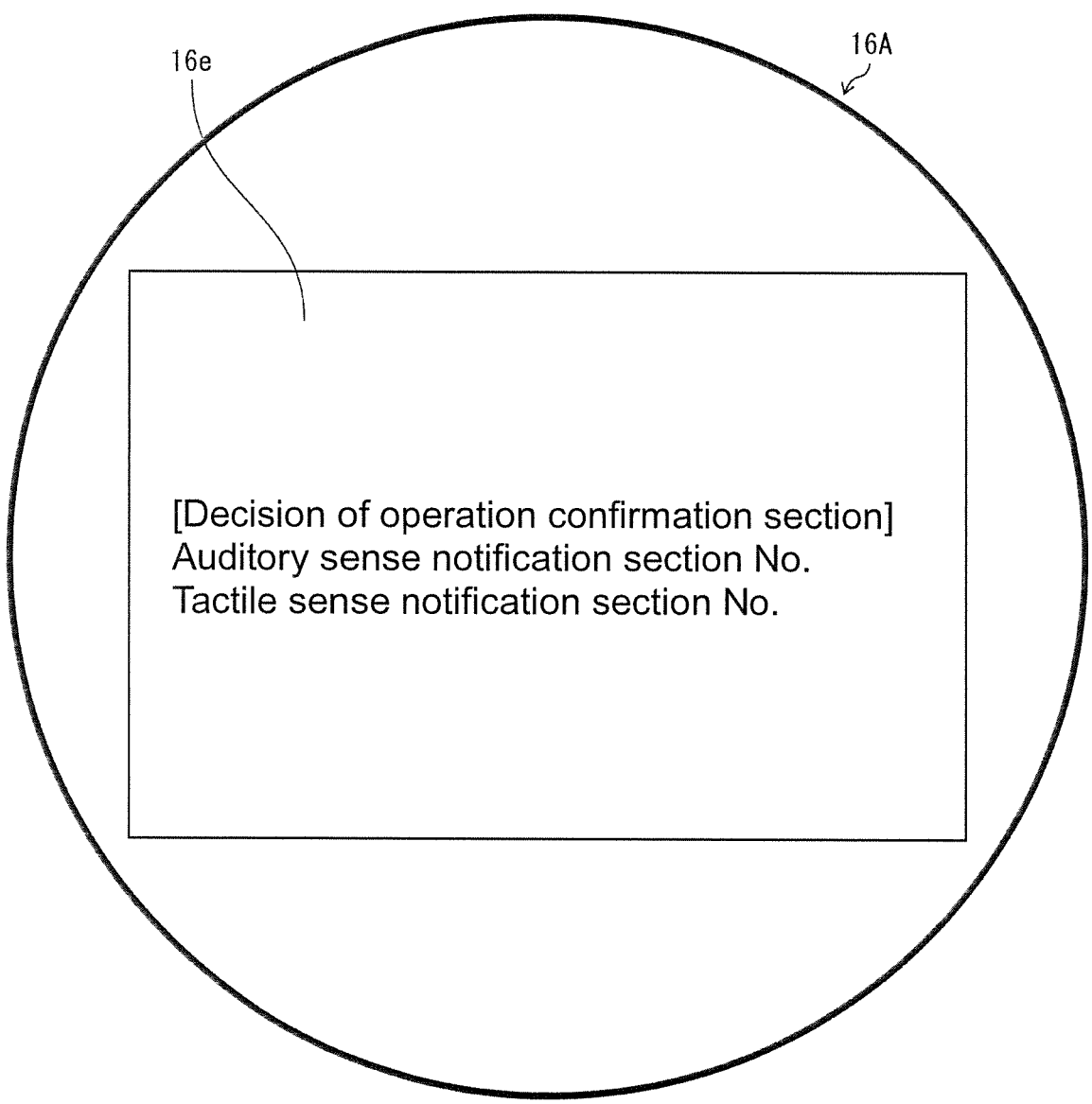
FIG. 10 is a plan view illustrating the display screen of the selected operation confirmation section displayed on the liquid crystal display in the operation part of the operation switch unit.

The configuration of the spin button 16A will be described with reference to FIGS. 7A, 7B, 8A, 8B, 9, and 10. FIG. 7A is a perspective view illustrating the configuration of the operation part of the operation switch unit 10A. FIG. 7B is a plan view illustrating the configuration of the spin button 16A of the operation switch unit 10A. FIG. 8A a perspective sectional view illustrating a section taken along line C-C in FIG. 7B, and illustrating the configuration of the spin button 16A before depression. FIG. 8B is a perspective sectional view illustrating a section taken along line C-C illustrated in FIG. 7B, and illustrating the configuration of the spin button 16A after the depression. FIG. 9 is a plan view illustrating a display screen of options of operation confirmation section displayed on a liquid crystal display 16e in the spin button 16A of the operation switch unit 10A. FIG. 10 is a plan view illustrating the display screen of the selected operation confirmation section displayed on the liquid crystal display 16e in the spin button 16A of the operation switch unit 10A.

As illustrated in FIGS. 7A, 7B, 8A, and 8B, the spin button 16A includes a spin button casing 16a having a cylindrical shape, the depression part 16b that is advanced and retracted in a depression direction by the depression in the spin button 16A, a coil spring 16c that upwardly biases the depression part 16b, and a lower support plate 16d that supports the coil spring 16c from the lower side.

Figure 11A:
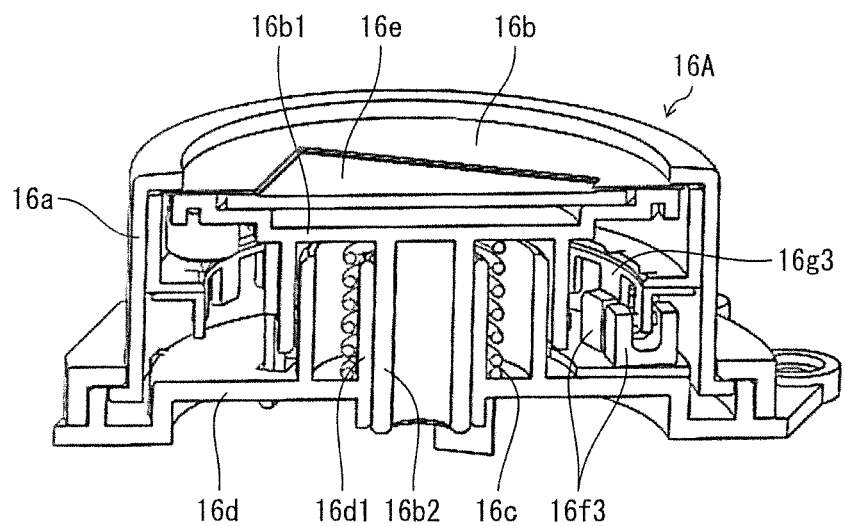
FIG. 11A is a perspective sectional view illustrating a section taken along line D-D in FIG. 7B and illustrating a configuration of a detector of the operation part.

As illustrated in FIG. 11A (to be described later), the lower support plate 16d has an upright inner cylinder 16d1 rising at the center. A hanging cylinder 16b2 of the depression part 16b hangs down from the metal plate 16b1 inside the upright inner cylinder 16d1, and the iron hammer 15a of the voice coil motor 15 is loosely fitted inside the hanging cylinder 16b2. The coil spring 16c is wound around an outside of the upright inner cylinder 16d1.

There is a gap between a top surface of the upright inner cylinder 16d1 and a bottom surface of the metal plate 16b1 provided on the bottom surface of the depression part 16b. Consequently, the depression part 16b can be depressed by a constant depression distance, and the depression part 16b returns upward by biasing force of the coil spring 16c when depression force of the depression part 16b is released.

As illustrated in FIGS. 8A and 8B, a display opening 16b3 is provided in the depression part 16b. As illustrated in FIG. 9, the liquid crystal display 16e displays the operation confirmation sections respectively corresponding to the ten bet buttons 18a to 18j and, when one of the operation confirmation sections is selected, displays the selected operation confirmation section for a certain period of time as illustrated in FIG. 10.

Figure 11B:
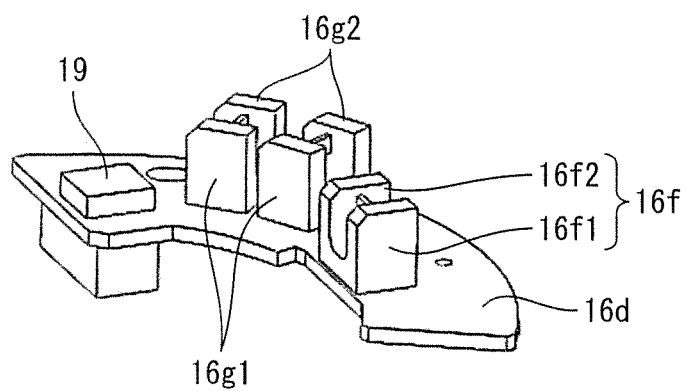
FIG. 11B is a main-part perspective view illustrating the detector that is extracted.

A mechanism that detects whether the depression part 16*b* is depressed in the spin button 16A of the first embodiment will be described below with reference to FIGS. 11A and 11B. FIG. 11A is a perspective sectional view illustrating a section taken along line D-D in FIG. 7B, and illustrating a configuration of a detector of the spin button 16A. FIG. 11B is a main-part perspective view illustrating the detector that is extracted.

As illustrated in FIGS. 8A, 8B, 11A, and 11B, the spin button 16A of the first embodiment includes the input detector 16*f* that detects that the depression part 16*b* is depressed. The input detector 16*f* includes a light emitting part 16*f*1, a light receiving part 16*f*2, and a shielding plate 16*f*3. In the input detector 16*f*, the light receiving part 16*f*2 receives light emitted by the light emitting part 16*f*1. The shielding plate 16*f*3 inserted between the light emitting part 16*f*1 and the light receiving part 16*f*2 blocks the light from the light emitting part 16*f*1 according to the depression of the spin button 16A. Consequently, the depression of the depression part 16*b* can be detected.

In the spin button 16A of the first embodiment, the spin button casing 16*a* is rotatable with respect to the lower support plate 16*d*. The spin button 16A of the first embodiment includes the input detector 16*g* that detects the rotation of the spin button casing 16*a*. The input detector 16*g* includes two sets of light receiving parts 16*g*2 that receive light emitted from two sets of light emitting parts 16*g*1 and a set of shielding plates 16*g*3 inserted between each light emitting part 16*g*1 and each light receiving part 16*g*2 according to the rotation of the spin button 16A. In the input detector 16*g*, the light from the light emitting part 16*g*1 is blocked by the shielding plate 16*g*3 in either of the two sets of the light emitting parts 16*g*1 and the two sets of light receiving parts 16*g*2, thereby detecting whether the depression part 16*b* rotates. Left rotation or right rotation can be detected as the detection of the rotation.

As illustrated in FIG. 11B, the controller 19 of the first embodiment is attached and fixed to the lower support plate 16*d* of the spin button 16A. The controller 19 is constructed with a CPU.

The operation switch unit 10A of the first embodiment is configured to notify the operator that the operation is performed when the spin button 16A is depressed. A configuration of the controller that notifies the operator that the operation is performed when the spin button 16A of the first embodiment is depressed will be described with reference to FIG. 1. FIG. 1 is a block diagram illustrating a configuration of a control mechanism of the operation switch unit 10A and the game machine 1 of the first embodiment.

As illustrated in FIG. 1, the operation switch unit 10A of the first embodiment includes the spin button 16A as the operation part, the input detectors 16*f*, 16*g* that detects the depression or rotation of the spin button 16A, the controller 19, and the notification part. In the first embodiment, a detector (not illustrated) that detects pressing or long pressing of the bet button 18 is provided.

In the first embodiment, the notification part includes the directional speaker 14, the voice coil motor 15, and the vibration speaker 17 that are the operation confirmation sections. That is, in the first embodiment, as described above, the directional speaker 14 functions as the auditory sense notification section 1 of the operation confirmation auditory sense notification section and the tactile sense notification section 1 of the operation confirmation tactile sense notification section, and the voice coil motor 15 functions as the tactile sense notification section 2 of the operation confirmation tactile sense notification section, and the vibration speaker 17 functions as the auditory sense notification section 2 of the operation confirmation auditory sense notification section. The casing-side controller 3 and the display 2 as a presentation part are also provided in the game machine 1. The game machine-side controller 3 performs control relating to presentation such as rotation and stop of the reels of the display 2.

According to input of an input signal from the spin button 16A and an input detection signal from the input detectors 16*f*,16*g*, the controller 19 performs the control such that the notification part performs the notification operation, and notifies the game machine-side controller 3 of the input of the signals.

Figure 12:
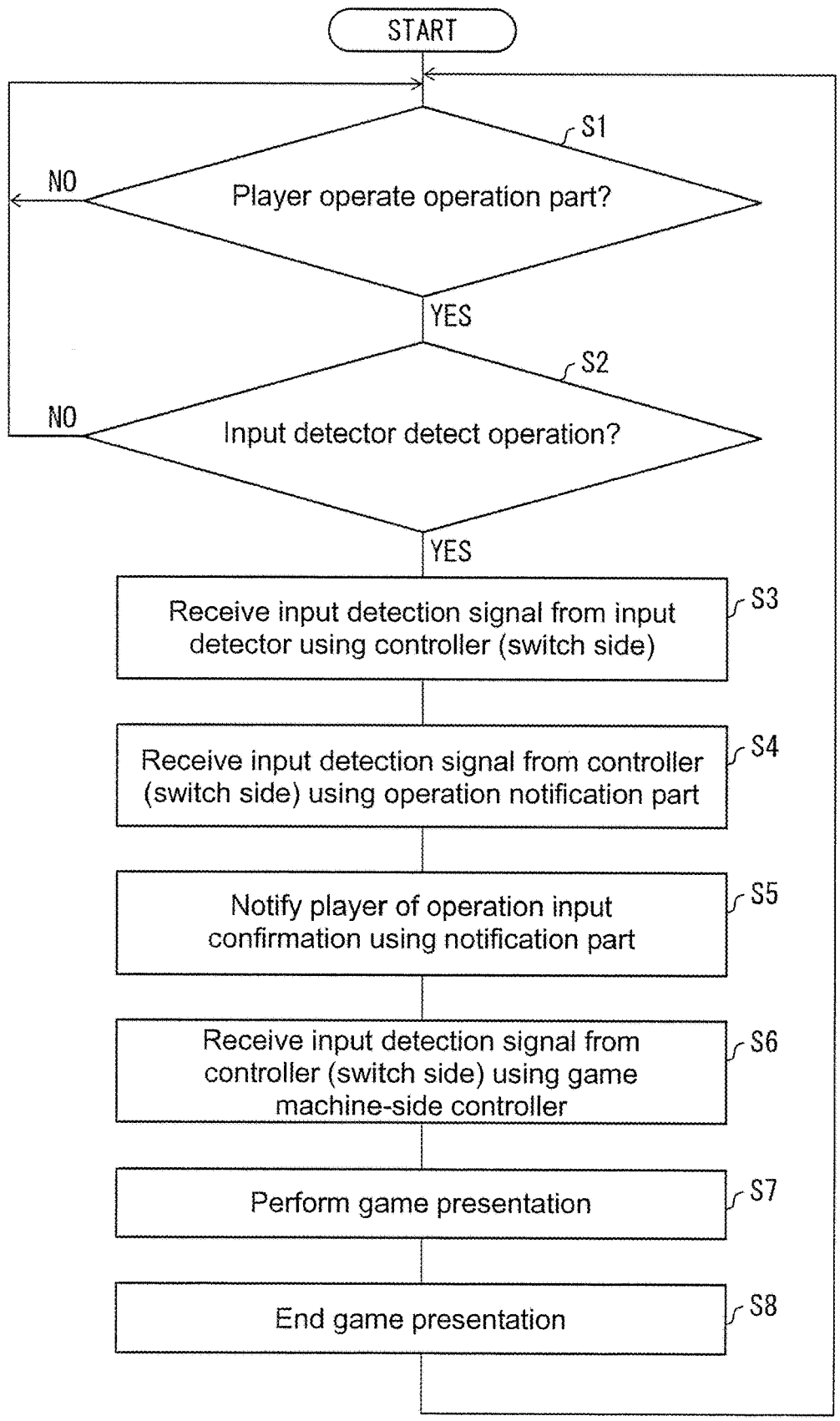
FIG. 12 is a flowchart illustrating a basic control action relating to a game by a control mechanism of the operation switch unit and the game machine.

A basic control action relating to a game by the control mechanism of the operation switch unit 10A and the game machine 1 will be described below with reference to FIG. 12. FIG. 12 is a flowchart illustrating the basic control action relating to the game by the control mechanism of the operation switch unit 10A and the game machine 1.

As illustrated in FIG. 12, the player operates the bet button 18 and the spin button 16A that are the operation parts (S1). Consequently, the bet button input detector (not illustrated) and the input detectors 16*f*, 16*g* detect whether the bet button 18 and the spin button 16A are operated (S2). When the negative determination is made in S1 and S2, the control action returns to S1.

When the input detectors 16*f*, 16*g* detect that the spin button 16A is operated in S2, the controller 19 of the operation switch unit 10A receives the input detection signals from the input detectors 16*f*, 16*g* (S3). Consequently, the notification part such as the directional speaker 14, the voice coil motor 15, and the vibration speaker 17 receives pressing operation confirmation, namely, the input detection signal from the controller 19 (S4). The notification part notifies the player of the operation input confirmation (S5).

Subsequently, the game machine-side controller 3 receives the input detection signal from the controller 19 of the operation switch unit 10A (S6). Consequently, the game machine 1 performs the game presentation under the control of the game machine-side controller 3 (S7). The game presentation means the control relating to the reel and the like. When the game presentation is ended (S8), the control action returns to S1 to wait for the operation of the spin button 16A of the operation switch unit 10A for the next game, and the control action in steps S1 to S8 is repeated as long as the player repeats the game.

Figure 13:
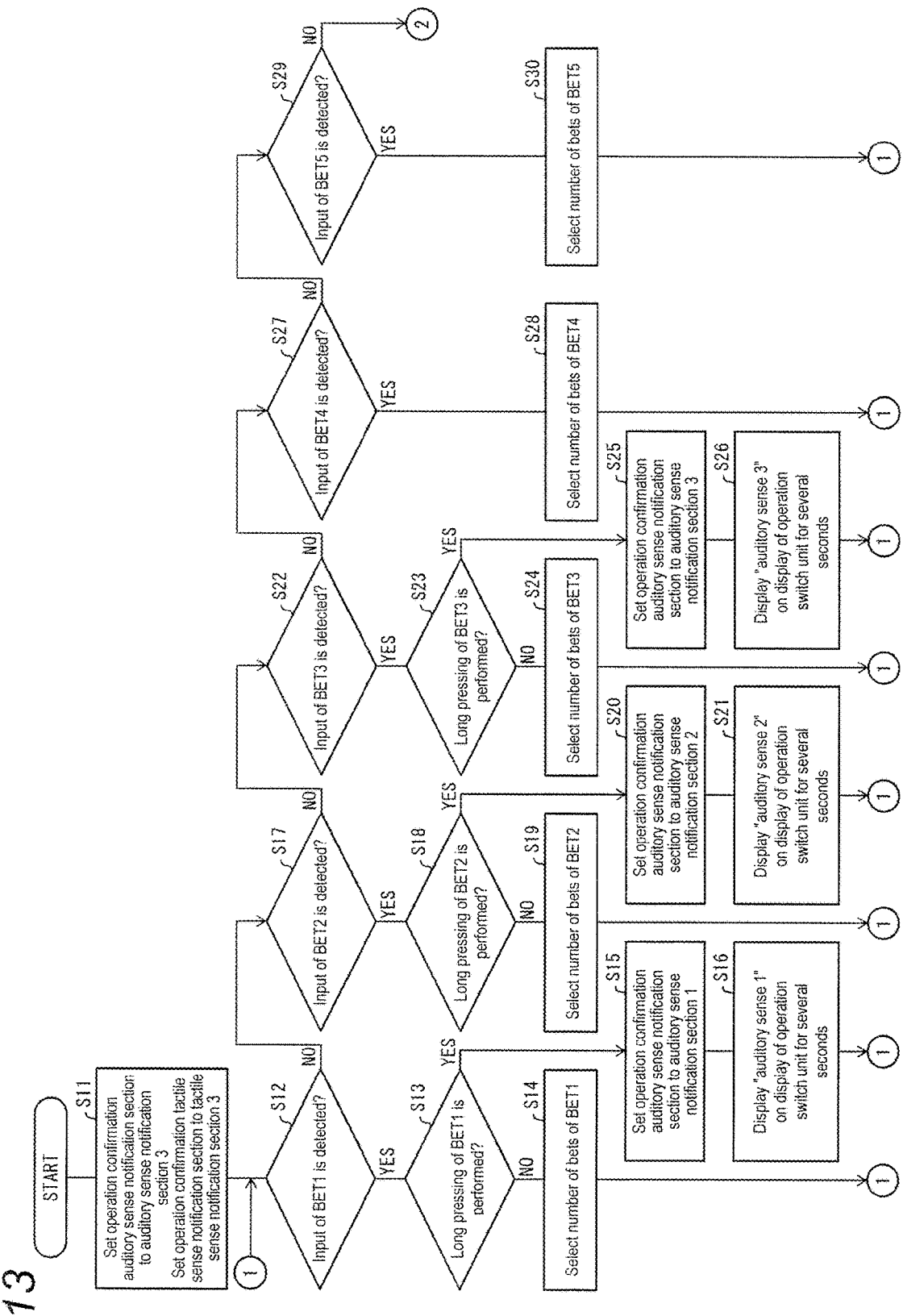
FIG. 13 is a flowchart illustrating a method for setting a bet number with a bet button in the operation switch unit and a method for selecting various kinds of operation confirmation sections.
Figure 14:
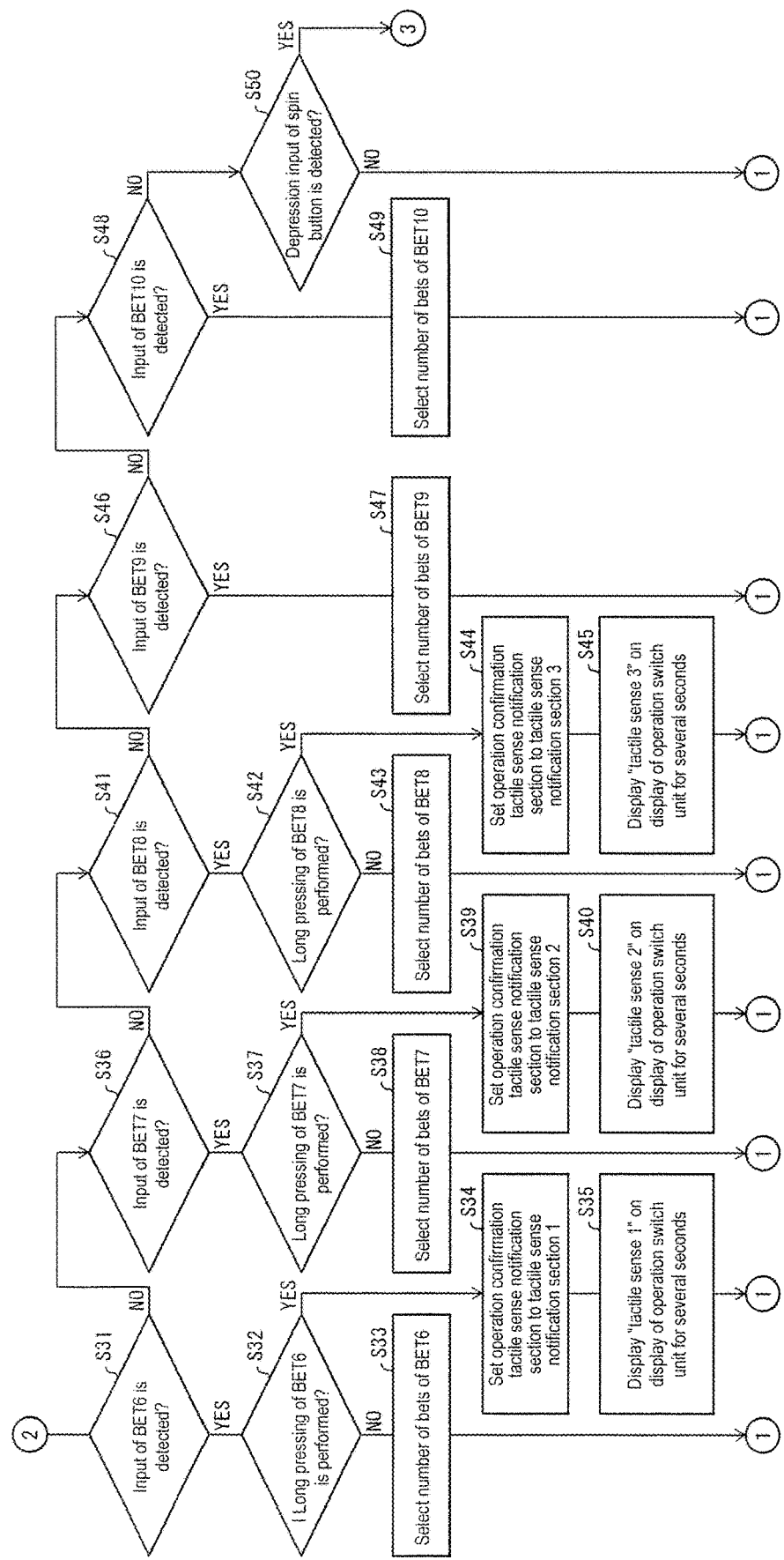
FIG. 14 is a flowchart illustrating the method for setting the bet number with the bet button in the operation switch unit and the method for selecting various kinds of operation confirmation sections, and illustrating a continuation of FIG. 13.
Figure 15:
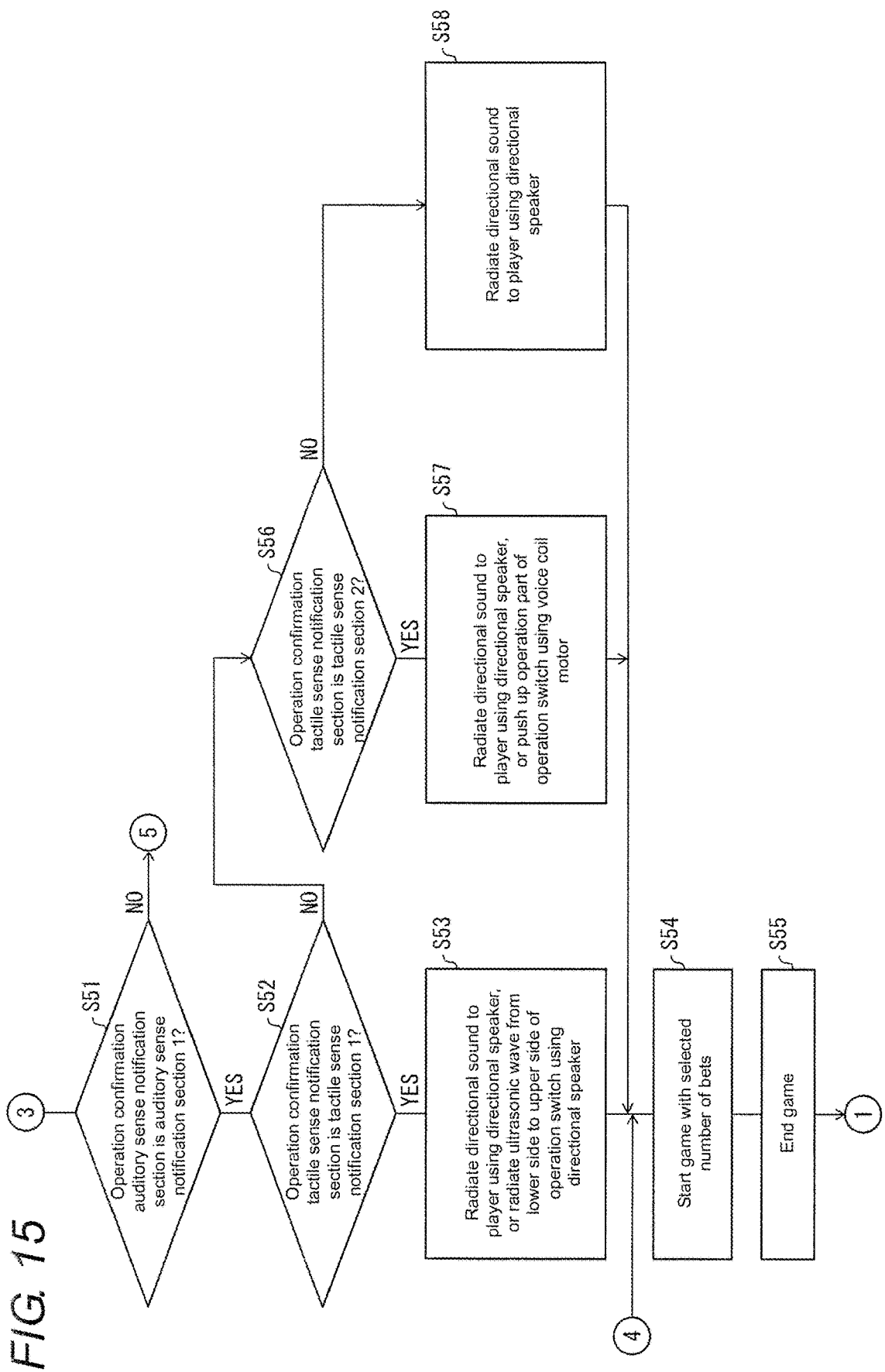
FIG. 15 is a flowchart illustrating the continuation of FIG. 14, and illustrating actions of an operation confirmation auditory sense notification section and an operation confirmation tactile sense notification section when a spin button in the operation switch unit is depressed.

A method for setting the number of bets by the bet button 18 in the operation switch unit 10A of the first embodiment and the method for selecting various operation confirmation sections will be described below with reference to FIGS. 13 to 15. FIGS. 13 to 15 are flowcharts illustrating the method for setting the number of bets with the bet button 18 in the operation switch unit 10A and the method for selecting various kinds of operation confirmation sections.

As illustrated in FIG. 13, as an initial value setting, an operation confirmation auditory sense notification section is set to an auditory sense notification section 3, and the operation confirmation tactile sense notification section is set to a tactile sense notification section 3 (S11). The auditory sense notification section 3 is an option not to use the operation confirmation auditory sense notification section, and the tactile sense notification section 3 is an option not to use the operation confirmation tactile sense notification section.

At this point, the bet button input detector (not illustrated) determines whether the input operation of the bet button 18*a* (described as "BET1" in FIG. 13) is performed (S12). When determining that the input operation of the bet button 18*a* is detected, the bet button input detector determines whether the long pressing of the bet button 18*a* is performed (S13). Whether the long pressing of the bet button 18*a* is performed is determined based on whether an input time of the bet button 18*a* is greater than or equal to, for example, 2 seconds.

When the bet button input detector determines that the long pressing of the bet button 18*a* is performed in S13, the controller 19 selects the number of bets of the bet button 18*a* (described as "BET1" in FIG. 13) (S14). In the first embodiment, the number of bets (bet number) of the bet button 18*a* is "1", so that the number of bets becomes 1. Then, the control action returns to S12.

When determining that the input operation of the bet button 18*a* is not detected in S12, the bet button input detector (not illustrated) determines whether the input operation of the bet button 18*b* (described as "BET2" in FIG. 13) is performed (S17). When determining that the input operation of the bet button 18*b* is detected, the bet button input detector determines whether the long pressing of the bet button 18*b* is performed (S18). Whether the long pressing of the bet button 18*b* is performed is determined based on whether the input time of the bet button 18*b* is greater than or equal to, for example, 2 seconds similarly to S13.

When the bet button input detector determines that the long pressing of bet button 18*b* is performed in S18, the controller 19 selects the number of bets of the bet button 18*b* (described as "BET2" in FIG. 13) (S19). In the first embodiment, the number of bets (bet number) of the bet button 18*b* is 2, so that the number of bets becomes 2. Then, the control action returns to S12.

In the first embodiment, any one of the ten bet buttons 18*a* to 18*j* is selected. For this reason, in the above description, the control action returns to S1 through S19, for example, for the determination that the input operation of the bet button 18*b* (described as "BET2" in FIG. 13) is performed. However, after that, because the ten bet buttons 18*a* to 18*j* used to set the number of bets should not be depressed, in the case that the control action is repeated, basically the negative determination is made in S12, the negative determination is made in S17, and the negative determination is made in S22, S27, S29, and S31, S36, S41, S46, S48 of FIG. 14. As a result, whether the depression input of the spin button 16A is performed is determined (S50).

However, sometimes the player changes the setting of the number of bets set for the first time. In such cases, when the control action from S12 is repeated, sometimes the pressing of the ten bet buttons 18*a* to 18*j* for setting the target number of bets is detected. In such cases, the bet button input detector (not illustrated) validates the number of bets set by the pressing of the bet buttons 18*a* to 18*j* pressed later.

In the operation switch unit 10A of the first embodiment, various kinds of operation confirmation sections can be selected. The method for selecting various kinds of operation confirmation sections will be described with reference to FIGS. 13 and 14.

As illustrated in FIGS. 13 and 14, when the setting of the number of bets by the bet button 18 is ended, whether the spin button 16A is depressed is determined in S50 of FIG. 14. For the determination that the spin button 16A is not depressed in S50, the control action returns to S12 in FIG. 13 again. In the first embodiment, the method for selecting various kinds of operation confirmation sections can be set by the long pressing of the specific bet button 18. Specifically, the setting can be performed by the bet button 18*a* (described as "BET1" in FIG. 13), the bet button 18*b* (described as "BET2" in FIG. 13), the bet button 18*c* (described as "BET3" in FIG. 13), the bet button 18*f* (described as "BET6" in FIG. 14), the bet button 18*g* (described as "BET7" in FIG. 14), and the bet button 18*h* (described as "BET8" in FIG. 14).

In particular, the bet button 18*a* (described as "BET1" in FIG. 13) sets the auditory sense notification section 1 as the operation confirmation auditory sense notification section, the bet button 18*b* (described as "BET2" in FIG. 13) sets the auditory sense notification section 2 as the operation confirmation auditory sense notification section, and the bet button 18*c* (described as "BET3" in FIG. 13) set the auditory sense notification section 3 as the operation confirmation auditory sense notification section.

The bet button 18*f* (described as "BET6" in FIG. 14) sets the tactile sense notification section 1 as the operation confirmation tactile sense notification section, the bet button 18*g* (described as "BET7" in FIG. 14) sets the tactile sense notification section 2 as the operation confirmation tactile sense notification section, and the bet button 18*h* (described as "BET8" in FIG. 14) sets the tactile sense notification section 3 as the operation confirmation tactile sense notification section.

At this point, the auditory sense notification section 1 is the operation confirmation auditory sense notification section by the directional speaker 14. The auditory sense notification section 2 is the operation confirmation auditory sense notification section by the vibration speaker 17. The auditory sense notification section 3 is the option not to use the operation confirmation auditory sense notification section as described above.

The tactile sense notification section 1 is the operation confirmation tactile sense notification section for emitting the ultrasonic wave toward the player with the directional speaker 14, and giving the vibration of the spin button 16A to the operator in handling the spin button 16A, thereby notifying the operator of the operation input confirmation by the tactile sense. The tactile sense notification section 2 is the operation confirmation tactile sense notification section for notifying the operator of the input by giving the impact with the voice coil motor 15 to push up the depression part 16*b* of the spin button 16A. The tactile sense notification section 3 is the option not to use the operation confirmation tactile sense notification section as described above.

The methods for setting the operation confirmation auditory sense notification section and the operation confirmation tactile sense notification section will be described with reference to FIGS. 13 and 14.

When the determination that the spin button 16A is not depressed is made in S50 of FIG. 14, and the control action returns to S12 in FIG. 14. At this point, when the determination that the input operation of the bet button 18*a* (described as "BET1" in FIG. 13) is made in S12, the bet button input detector determines whether the long pressing of the bet button 18*a* is performed (S13). When the determination that the long pressing of the bet button 18*a* is performed is made, the controller 19 sets the auditory sense notification section 1 as the operation confirmation auditory sense notification section (S15). The auditory sense notification section 1 is the operation confirmation auditory sense notification section by the directional speaker 14.

Subsequently, as illustrated in FIG. 10, the controller 19 performs the display that the selected operation confirmation section is the auditory sense notification section 1 on the liquid crystal display 16e of the spin button 16A for a certain period of time (S16). Before the operation confirmation section is selected, the screen in FIG. 10 is displayed on the liquid crystal display 16e of the spin button 16A. Then, the control action returns to S12.

When the determination that the spin button 16A is not depressed is made in S50 of FIG. 14, the control action returns to S12 in FIG. 14. At this point, when the determination that the input operation of the bet button 18a is not performed is made in S12, whether the input operation of the bet button 18b (described as "BET2" in FIG. 13) is performed is determined (S17). When the determination that the input operation of the bet button 18b is performed is made in S17, the bet button input detector determines whether the long pressing of the bet button 18b is performed (S18). When the determination that the long pressing of the bet button 18b is performed is made in S18, the controller 19 sets the auditory sense notification section 2 as the operation confirmation auditory sense notification section (S20). The auditory sense notification section 2 is the operation confirmation auditory sense notification section by the vibration speaker 17.

Subsequently, as illustrated in FIG. 10, the controller 19 performs the display that the selected operation confirmation section is the auditory sense notification section 2 on the liquid crystal display 16e of the spin button 16A for a certain period of time (S21). Then, the control action returns to S12.

When the determination that the spin button 16A is not depressed is made in S50 of FIG. 14, the control action returns to S12 in FIG. 14. At this point, when the determination that the input operation of the bet button 18a (described as "BET1" in FIG. 13) is not performed is made in S12, whether the input operation of the bet button 18b (described as "BET2" in FIG. 13) is performed is determined (S17). When the determination that the input operation of the bet button 18b is not performed is made in S17, whether the input operation of the bet button 18c (described as "BET3" in FIG. 13) is performed is determined (S22). When the determination that the input operation of the bet button 18c is performed is made in S22, the bet button input detector determines whether the long pressing of the bet button 18c is performed (S23). When the determination that the long pressing of the bet button 18c is performed is made in S23, the controller 19 sets the auditory sense notification section 3 as the operation confirmation auditory sense notification section (S25). The auditory sense notification section 3 is the option not to use the operation confirmation auditory sense notification section. In the first embodiment, the auditory sense notification section 3 is set to the operation confirmation auditory sense notification section at the initial setting in S11. For this reason, this control action is effective for the case where the auditory sense notification section 1 or the tactile sense notification section 2 is changed when the operation confirmation auditory sense notification section is already set to the auditory sense notification section 1 or the tactile sense notification section 2. Subsequently, as illustrated in FIG. 10, the controller 19 performs the display that the selected operation confirmation section is the auditory sense notification section 3 on the liquid crystal display 16e of the spin button 16A for a certain period of time (S26). Then, the control action returns to S12.

Subsequently, in the case where the operation confirmation tactile sense notification section is set, after the control action returns to S12 in FIG. 13, the negative determination is made in S12, the negative determination is made in S17, S22, S27, and S29, and whether the input operation of the bet button 18f (described as "BET6" in FIG. 14) is performed is determined in S31 of FIG. 14. When the determination that the input operation of the bet button 18f (described as "BET6" in FIG. 14) is performed is made in S31 of FIG. 14, the bet button input detector determines whether the long pressing of the bet button 18f is performed (S32). When the determination that the long pressing of the bet button 18f is performed is made in S32, the controller 19 sets the tactile sense notification section 1 as the operation confirmation tactile sense notification section (S34). The tactile sense notification section 1 is the operation confirmation tactile sense notification section for emitting the ultrasonic wave toward the player with the directional speaker 14, and giving the vibration of the spin button 16A to the operator in handling the spin button 16A, thereby notifying the operator of the operation input confirmation by the tactile sense.

Subsequently, as illustrated in FIG. 10, the controller 19 performs the display that the selected operation confirmation section is the tactile sense notification section 1 on the liquid crystal display 16e of the spin button 16A for a certain period of time (S35). Then, the control action returns to S12 in FIG. 13.

Similarly, after the control action returns to S12 in FIG. 13, the negative determination is made in S12, the negative determination is made in S17, S22, S27, and S29, and the negative determination is made in S31 of FIG. 14. For this reason, whether the input operation of the bet button 18g (described as "BET7" in FIG. 14) is performed is determined in S36 of FIG. 14. When the determination that the input operation of the bet button 18g (described as "BET7" in FIG. 14) is performed is made in S36 of FIG. 14, the bet button input detector determines whether the long pressing of the bet button 18g is performed (S37). When the determination that the long pressing of the bet button 18g is performed is made in S37, the controller 19 sets the tactile sense notification section 2 as the operation confirmation tactile sense notification section (S39). The tactile sense notification section 2 is the operation confirmation tactile sense notification section for notifying the operator of the input by giving the impact with the voice coil motor 15 to push up the depression part 16b of the spin button 16A.

Subsequently, as illustrated in FIG. 10, the controller 19 performs the display that the selected operation confirmation section is the tactile sense notification section 2 on the liquid crystal display 16e of the spin button 16A for a certain period of time (S40). Then, the control action returns to S12 in FIG. 13.

Similarly, after the control action returns to S12 in FIG. 13, the negative determination is made in S12, the negative determination is made in S17, S22, S27, and S29, and the negative determination is made in S31 and S36 in FIG. 14. At this point, whether the input operation of the bet button 18h (described as "BET8" in FIG. 14) is performed is determined in S41 of FIG. 14. When the determination that the input operation of the bet button 18h (described as "BET8" in FIG. 14) is performed is made in S41 of FIG. 14, the bet button input detector determines whether the long pressing of the bet button 18h is performed (S42). When the determination that the long pressing of the bet button 18h is performed is made in S42, the controller 19 sets the tactile sense notification section 3 as the operation confirmation tactile sense notification section (S44). The tactile sense notification section 3 is the option not to use the operation confirmation tactile sense notification section. In the first embodiment, the tactile sense notification section 3 is set to the operation confirmation tactile sense notification section at the initial setting in S11 of FIG. 13. For this reason, this control action is effective for the case where the tactile sense notification section 1 or the tactile sense notification section 2 is changed when the operation confirmation tactile sense notification section is already set to the tactile sense notification section 1 or the tactile sense notification section 2. Subsequently, as illustrated in FIG. 11, the controller 19 performs the display that the selected operation confirmation section is the tactile sense notification section 3 on the liquid crystal display 16e of the spin button 16A for a certain period of time (S45). Then, the control action returns to S12 in FIG. 13.

In the above description, for the sake of easy understanding, various kinds of operation confirmation sections are selected after the number of bets is set by the bet button 18. However, in practice, there is no limitation to order of the setting of the number of bets by the bet button 18 and the selection of various kinds of operation confirmation sections. That is, the number of bets (bet number) can be set when the bet button 18 is pressed for a short time, and various kinds of operation confirmation sections can be selected when the bet button 18 is pressed for a long time.

Figure 16:
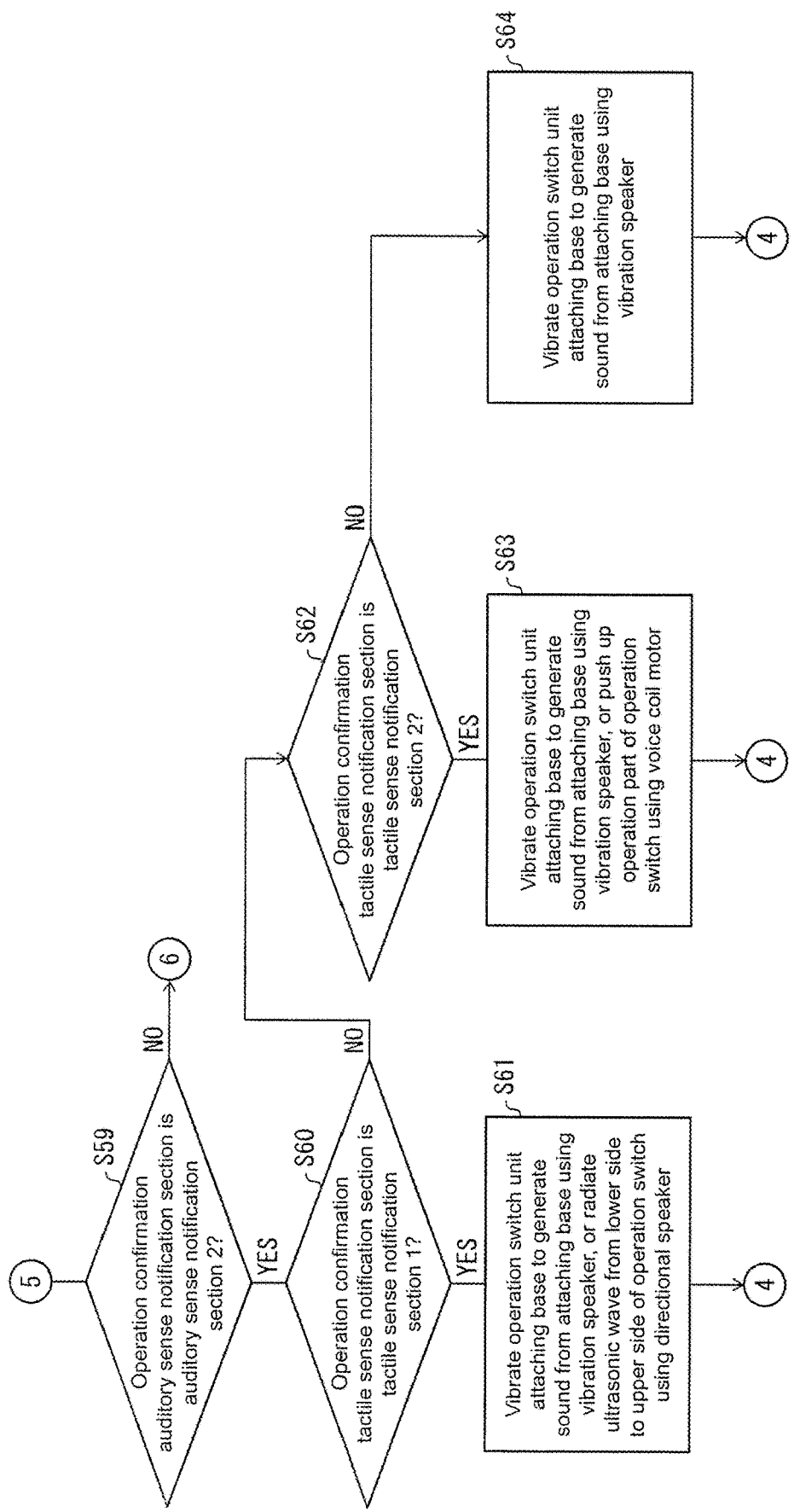
FIG. 16 is a flowchart illustrating selection actions of the operation confirmation auditory sense notification section and the operation confirmation tactile sense notification section when the spin button in the operation switch unit is depressed, and illustrating the continuation of FIG. 15.
Figure 17:
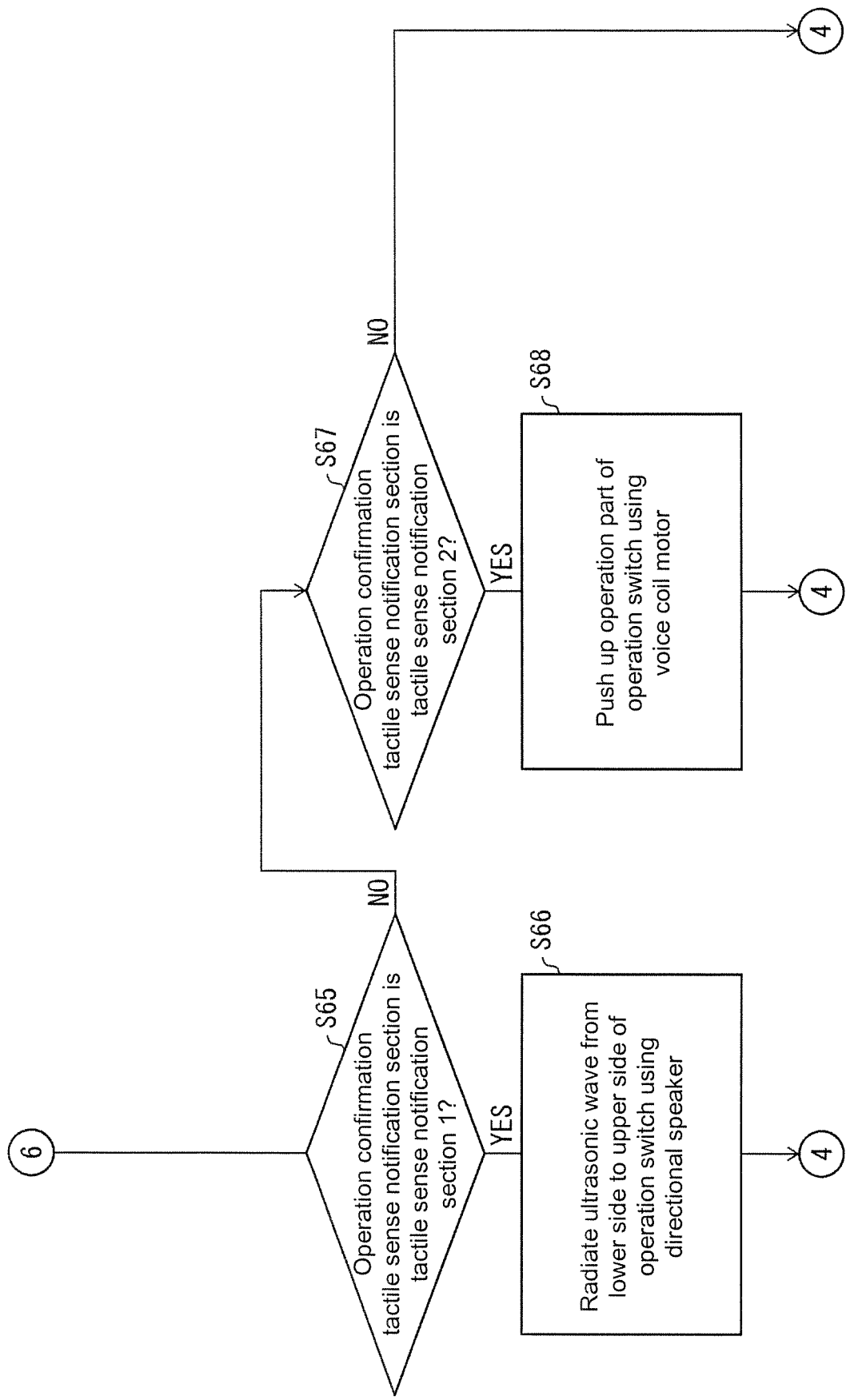
FIG. 17 is a flowchart illustrating the selection actions of the operation confirmation auditory sense notification section and the operation confirmation tactile sense notification section when the spin button in the operation switch unit is depressed, and illustrating the continuation of FIG. 16.

The action in the case where the input detectors 16f, 16g detect that the depression part 16b of the spin button 16A is depressed will be described below with reference to FIGS. 15 to 17. FIGS. 15 to 17 are flowcharts illustrating the action by the operation confirmation auditory sense notification section and the operation confirmation tactile sense notification section when the spin button 16A is operated.

When the input detectors 16f, 16g detect that the depression part 16b of the spin button 16A is depressed in S50 of FIG. 14, whether the operation confirmation auditory sense notification section is the auditory sense notification section 1 is determined as illustrated in FIG. 15 (S51). At this point, when the operation confirmation auditory sense notification section is determined to be the auditory sense notification section 1, whether the operation confirmation tactile sense notification section is the tactile sense notification section 1 is determined (S52). When the operation confirmation tactile sense notification section is determined to be the tactile sense notification section 1, the auditory sense notification section 1 radiates the directional sound as the actual operation confirmation notification to the player using the directional speaker 14, and the tactile sense notification section 1 radiates the ultrasonic wave from the lower side to the upper side of the spin button 16A using the directional speaker 14 (S53).

Then, the game is started with the selected number of bets (bet number) (S54), and the game is ended by displaying the reel (S55).

When the operation confirmation tactile sense notification section is determined not to be the tactile sense notification section 1 in S52, whether the operation confirmation tactile sense notification section is the tactile sense notification section 2 is determined (S56). When the operation confirmation tactile sense notification section is determined to be the tactile sense notification section 2, the auditory sense notification section 1 radiates the directional sound as the actual operation confirmation notification to the player using the directional speaker 14, and the tactile sense notification section 2 pushes up the depression part 16b of the spin button 16A using the voice coil motor 15 (S57).

When the operation confirmation tactile sense notification section is determined not to be the tactile sense notification section 2 in S56, the operation confirmation tactile sense notification section is regarded as the tactile sense notification section 3. As a result, the auditory sense notification section 1 radiates the directional sound to the player using the directional speaker 14, but the tactile sense notification section 3 does not use the operation confirmation tactile sense notification section (S58).

When the operation confirmation auditory sense notification section is determined not to be the auditory sense notification section 1 in S51, whether the operation confirmation auditory sense notification section is the auditory sense notification section 2 is determined as illustrated in FIG. 16 (S59). At this point, when the operation confirmation auditory sense notification section is determined to be the auditory sense notification section 2, whether the operation confirmation tactile sense notification section is the tactile sense notification section 1 is determined (S60). When the operation confirmation tactile sense notification section is determined to be the tactile sense notification section 1, the auditory sense notification section 2 generates the contact sound as the actual operation confirmation notification to the lower attaching base 12 of the spin button 16A using the vibration speaker 17, and the tactile sense notification section 1 radiates the ultrasonic wave from the lower side to the upper side of the spin button 16A using the directional speaker 14 (S61).

When the operation confirmation tactile sense notification section is determined not to be the tactile sense notification section 1 in S60, whether the operation confirmation tactile sense notification section is the tactile sense notification section 2 is determined (S62). When the operation confirmation tactile sense notification section is determined to be the tactile sense notification section 2, the auditory sense notification section 2 generates the contact sound as the actual operation confirmation notification to the lower attaching base 12 of the spin button 16A using the vibration speaker 17, and the tactile sense notification section 2 pushes up the depression part 16b of the spin button 16A using the voice coil motor 15 (S63).

When the operation confirmation tactile sense notification section is determined not to be the tactile sense notification section 2 in S62, the operation confirmation tactile sense notification section is regarded as the tactile sense notification section 3. As a result, the auditory sense notification section 2 generates the contact sound as the actual operation confirmation notification to the lower attaching base 12 of the spin button 16A using the vibration speaker 17, but the tactile sense notification section 3 does not use the operation confirmation tactile sense notification section (S64).

When the operation confirmation auditory sense notification section is determined not to be the auditory sense notification section 2 in S59 of FIG. 16, whether the operation confirmation tactile sense notification section is the tactile sense notification section 1 is determined as illustrated in FIG. 17 (S65). When the operation confirmation tactile sense notification section is determined to be the tactile sense notification section 1, the operation confirmation tactile sense notification section regarded as the auditory sense notification section 3 is not used as the actual operation confirmation notification, but the tactile sense notification section 1 radiates the ultrasonic wave from the lower side to the upper side of the spin button 16A using the directional speaker 14 (S66).

When the operation confirmation tactile sense notification section is determined not to be the tactile sense notification section 1 in S65, whether the operation confirmation tactile sense notification section is the tactile sense notification section 2 is determined (S67). When the operation confirmation tactile sense notification section is determined to be the tactile sense notification section 2, the operation confirmation tactile sense notification section regarded as the auditory sense notification section 3 is not used as the actual operation confirmation notification, but the tactile sense notification section 2 pushes up the depression part 16*b* of the spin button 16A using the voice coil motor 15 (S68).

When the operation confirmation tactile sense notification section is determined not to be the tactile sense notification section 2 in S67, the operation confirmation tactile sense notification section is regarded as the tactile sense notification section 3. As a result, the control action returns to S54 in FIG. 15 without doing anything by the auditory sense notification section 3 and the tactile sense notification section 3 as the actual operation confirmation notification, the game is started with the selected number of bets (bet number), and the game is ended by displaying the reel (S55).

In this way, the operation switch unit 10A of the game machine 1 of the first embodiment is attached to the game machine 1. The operation switch unit 10A includes the spin button 16A and the bet button 18 as the operation part that receives the input operation of the operator, the input detector 16*f* that detects that the input operation of the operator is performed, and the controller 19 that controls the notification part such that the notification part emits the directional sound, which does not spread uniformly but has directionality, to the operator as the notification that the input operation is performed based on a detection signal from the input detector 16*f*. As a result, the notification part causes only the person who performs the operation to hear the operation confirmation notification.

Figure 23A:
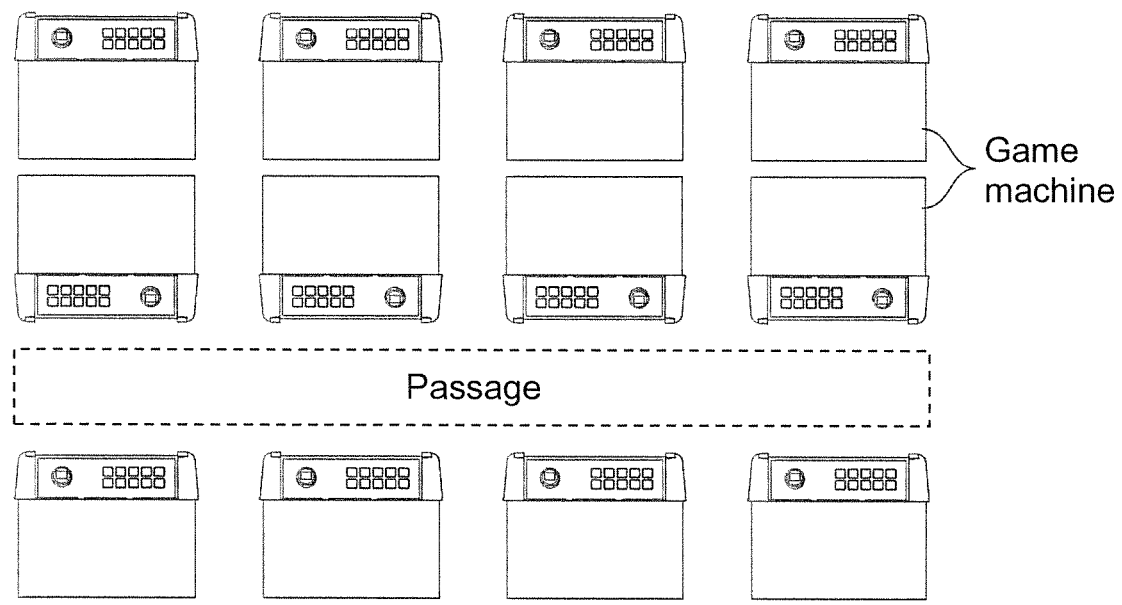
FIG. 23A is a plan view illustrating an arrangement state of the game machines arranged in the amusement shop.
Figure 23B:
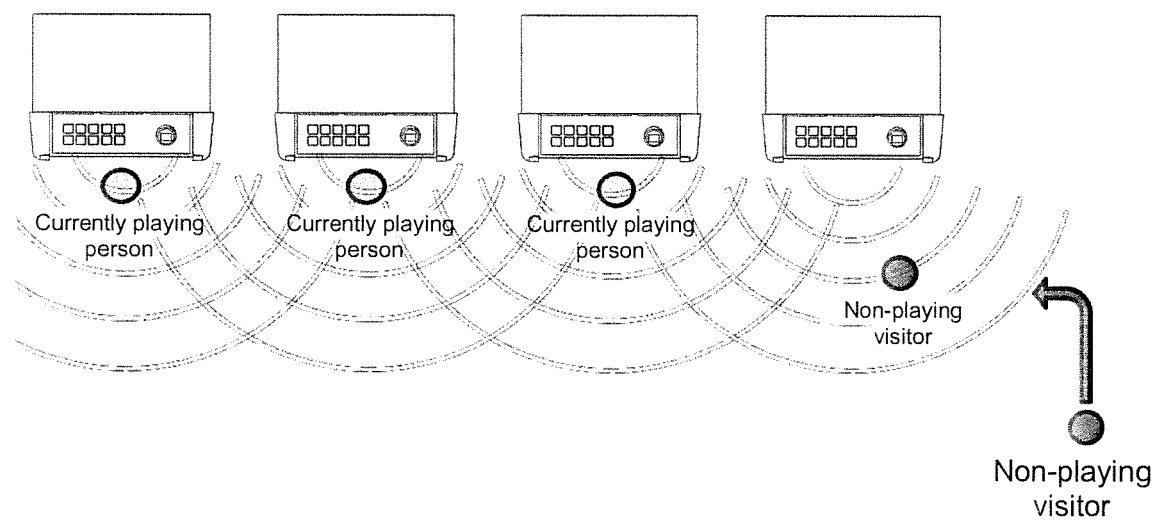
FIG. 23B is a plan view illustrating a state in which an operation confirmation sound consisting of a radially-diffused sound is emitted from a conventional game machine arranged in the amusement shop.

That is, conventionally, an operator who plays an adjacent game machine can hear the operation confirmation sound because the operation confirmation sound indicating that the input operation is performed is radially diffused as illustrated in FIGS. 23A and 23B. On the contrary, this means that the operator hears the operation confirmation sound from the next although the operator does not perform the input operation on the operation part. As a result, it is difficult to distinguish whether the operation confirmation sound heard by the operator is the own operation confirmation sound or the operation confirmation sound emitted by another person. Thus, the scene in which the player conceives that the bet button is pressed by the operation confirmation sound of the surrounding player although the bet button is not pressed is generated while the player gazes at the game screen.

Figure 18A:
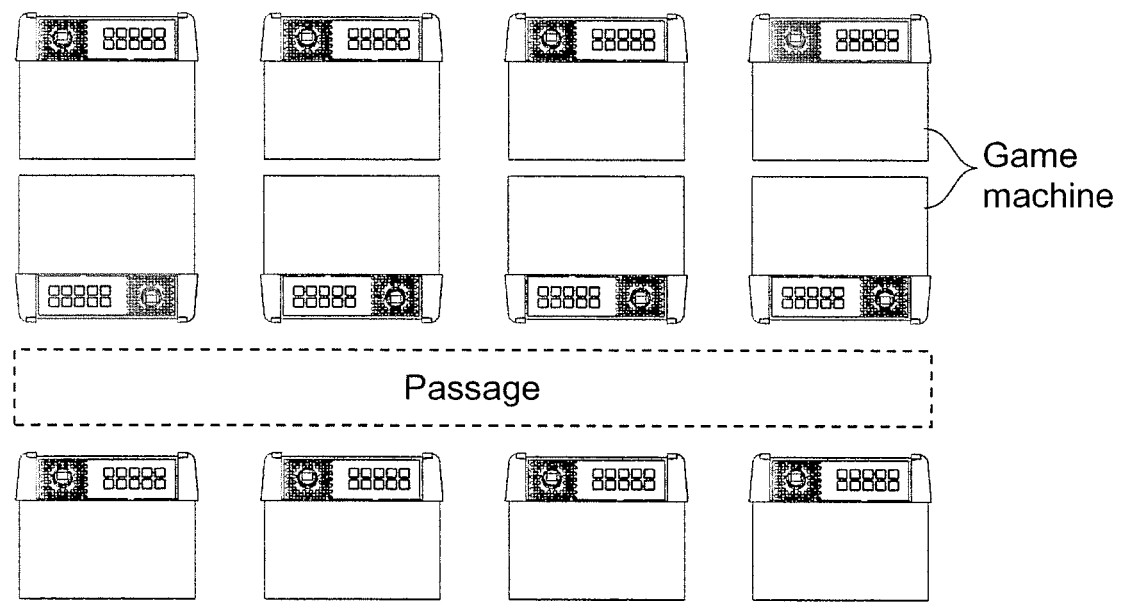
FIG. 18A is a plan view illustrating an arrangement state of the game machines arranged in an amusement shop.
Figure 18B:
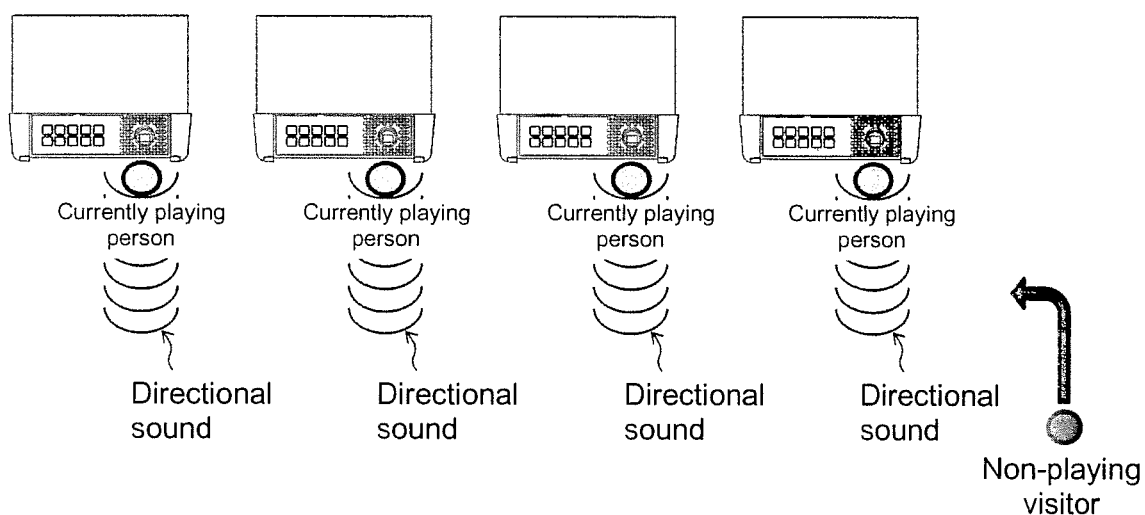
FIG. 18B is a plan view illustrating a state in which an operation confirmation sound consisting of a directional sound is emitted from the game machine arranged in the amusement shop.

On the other hand, according to this configuration, the directional speaker 14 issues an instruction to notify the operator that the operation input is performed by the directional sound. At this point, the directional sound is the sound that does not spread uniformly but has the directionality as illustrated in FIGS. 18A and 18B. Consequently, only the operator can hear the notification sound of operation confirmation, so that the operator cannot hear the notification sound of the operation confirmation of another person from a neighbor. As a result, the operator cannot hear the notification sound of the operation confirmation of another person from the neighbor, so that a possibility of erroneous operation is eliminated.

Thus, only a player who plays a game is notified such that the player can hear the operation confirmation sound, which allows the operation switch unit 10A that can prevent another player from erroneously recognizing the operation confirmation sound to be provided by the operation confirmation sound.

In the operation switch unit 10A of the first embodiment, the notification part issues the instruction to notify the operator that the operation input is performed by the directional sound using the directional speaker 14. As a result, the directional speaker radiates the sound only at a narrow angle. Thus, the operator can surely be notified that the operation input is performed by the directional sound.

In the operation switch unit 10A of the first embodiment, the notification part may notify the operator that the operation input is performed by a method other than the method for notifying the operator by the directional sound. The bet button 18 as a notification method selector that selects whether to notify the operator by the directional sound, by a method other than the directional sound, or both the directional sound and a method other than the directional sound is provided. As a result, the operator can select the method preferred by the operator as the operation confirmation by the bet button 18.

The operation switch unit 10A of the first embodiment includes the liquid crystal display 16*e* as the notification method display that displays the selected notification method. Consequently, the operator can confirm the notification method selected by viewing the liquid crystal display 16*e*, so that the operation confirmation notification can be confirmed from both the auditory sense and the visual sense.

In the operation switch unit 10A of the first embodiment, the liquid crystal display 16*e* as the notification method display is provided in the spin button 16B. As a result, the operator can confirm the selected notification method by viewing the liquid crystal display 16*e* provided in the spin button 16A to be used in the operation input. Thus, the operation switch unit 10A having convenience can be provided.

In the operation switch unit 10A of the first embodiment, the notification part is provided in the spin button 16B.

Consequently, necessity to seek an appropriate place to which the notification part is attached in the game machine 1 is eliminated, so that the notification part is easy to set.

The game machine 1 of the first embodiment includes the operation switch unit 10A. Consequently, it is possible to provide the game machine 1 including the operation switch unit 10A that can make the notification such that the operation confirmation sound can be heard only by the player who performs the operation.

Second Embodiment

Another embodiment of the present invention will be described with reference to FIGS. 19 to 22. The configurations other than those described in a second embodiment are identical to those of the first embodiment. For convenience, the member having the same functions as the member illustrated in the drawings of the first embodiment is denoted by the same reference numeral, and the description will be omitted.

An operation switch unit 10B in the game machine 1 of the second embodiment is different from the operation switch unit 10A of the first embodiment in that a plurality of operation confirmation sound effects can be set.

Figure 19:
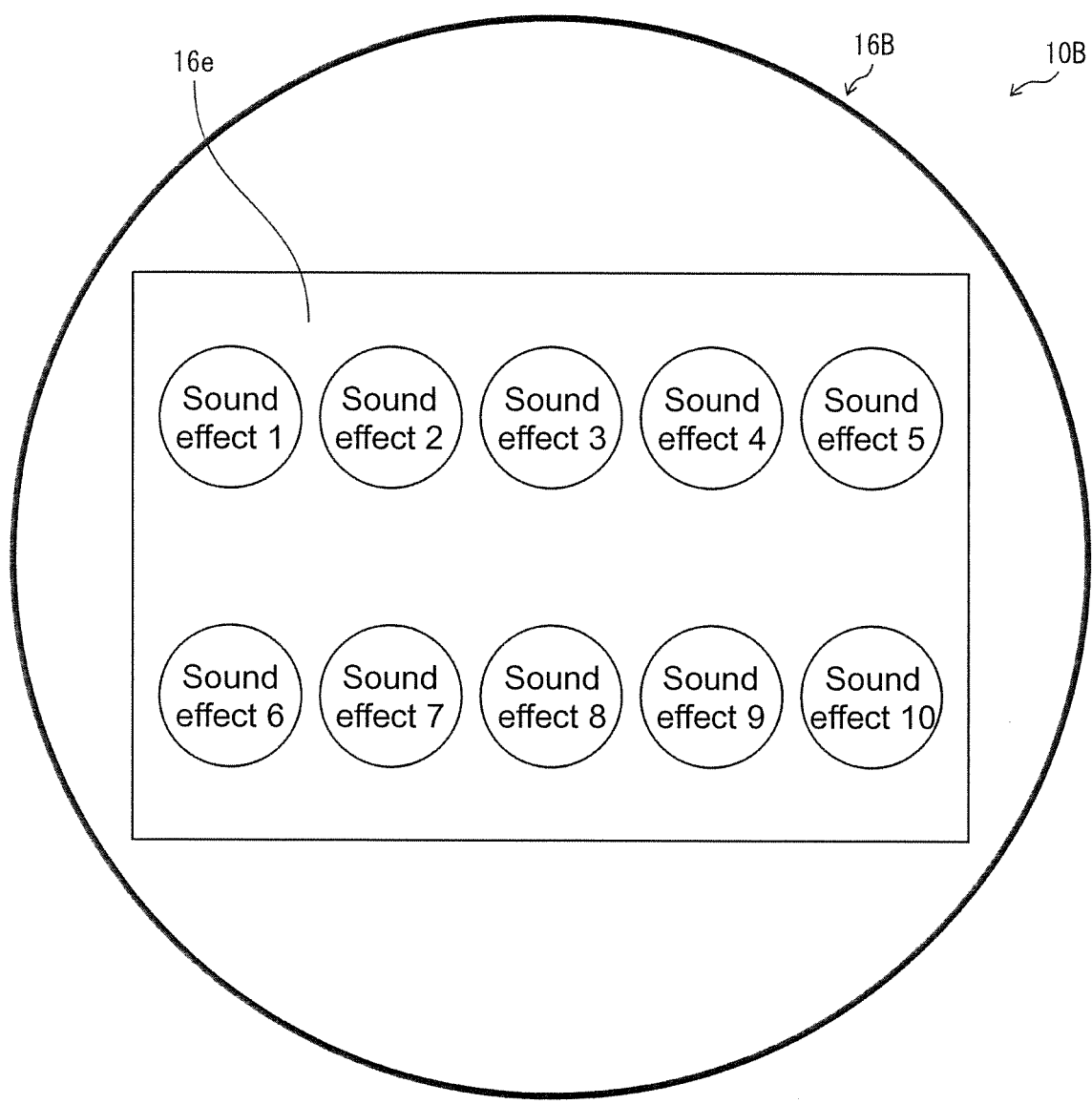
FIG. 19 is a plan view illustrating an operation switch unit and a game machine according to a second embodiment of the present invention, and illustrating a display screen of sound effect options displayed on a liquid crystal display in an operation part of the operation switch unit.
Figure 20:
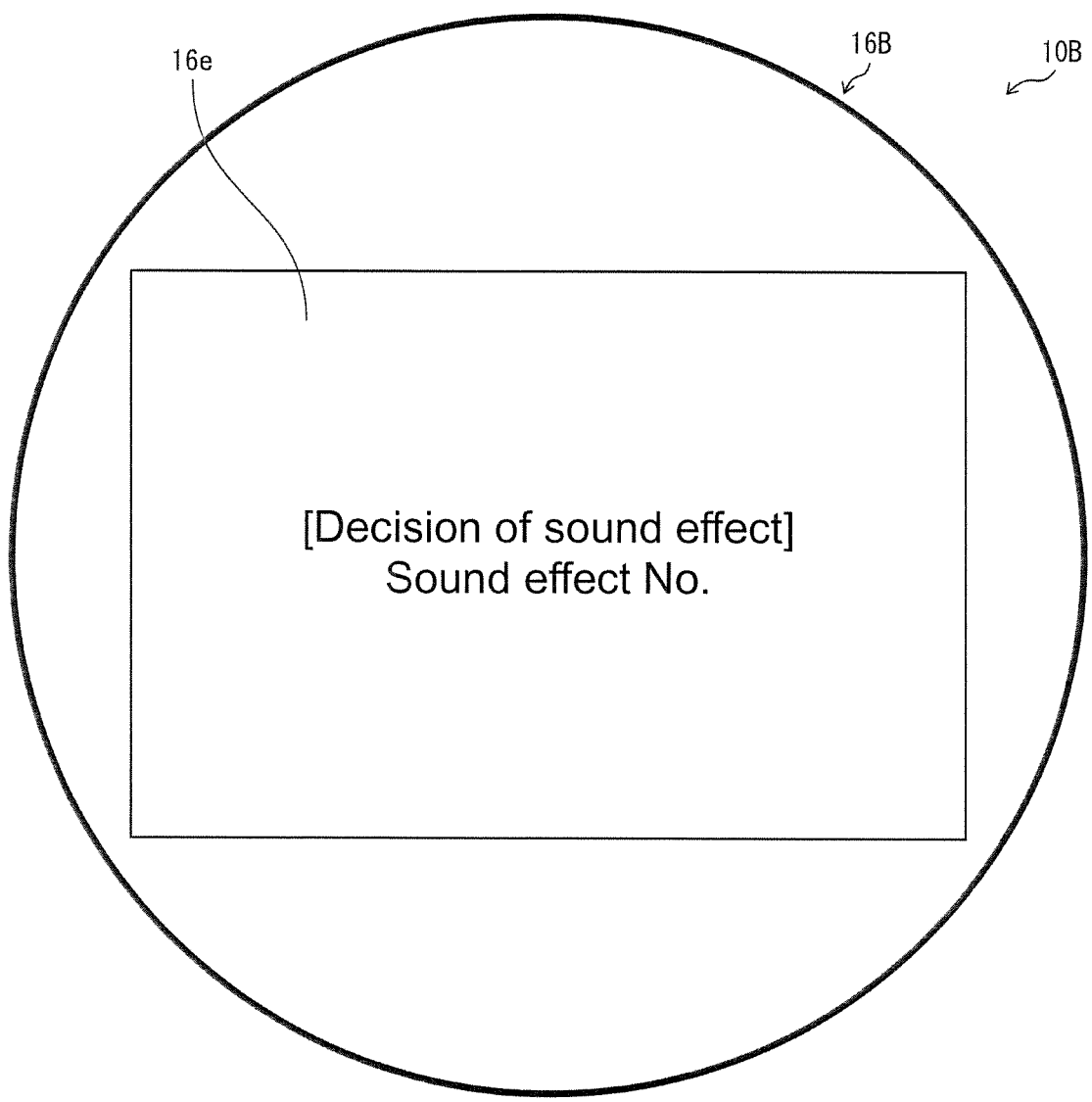
FIG. 20 is a plan view illustrating the display screen of the selected sound effect displayed on the liquid crystal display in the operation part of the operation switch unit.

The configuration of the operation switch unit 10B of the second embodiment will be described with reference to FIGS. 19 and 20. FIG. 19 is a plan view illustrating the display screen of sound effect options displayed on the liquid crystal display 16*e* in a spin button 16B of the operation switch unit 10B of the second embodiment. FIG. 20 is a plan view illustrating the display screen of the selected sound effect displayed on the liquid crystal display 16*e* in the spin button 16B of the operation switch unit 10B.

In the operation switch unit 10B of the second embodiment, in the case where the sound is emitted from the directional speaker 14, for example, ten kinds of sound effects are generated according to ten bet buttons 18 as an operation notification sound selector.

As illustrated in FIG. 19, selection display is performed on the liquid crystal display 16*e* in order to select up to ten sound effects 1 to 10 according to the ten bet buttons 18. As to the currently-selected operation confirmation sound effect, preferably the operation confirmation sound effect is currently selected by lighting a lamp on the display of the sound effects 1 to 10.

In the second embodiment, the ten sound effects 1 to 10 can be selected by performing the long pressing of the bet button 18 for, for example, 3 seconds, and resultantly the selected sound effect is displayed for a certain period of time on the liquid crystal display 16*e* as an operation notification sound display as illustrated in FIG. 20.

Figure 21:
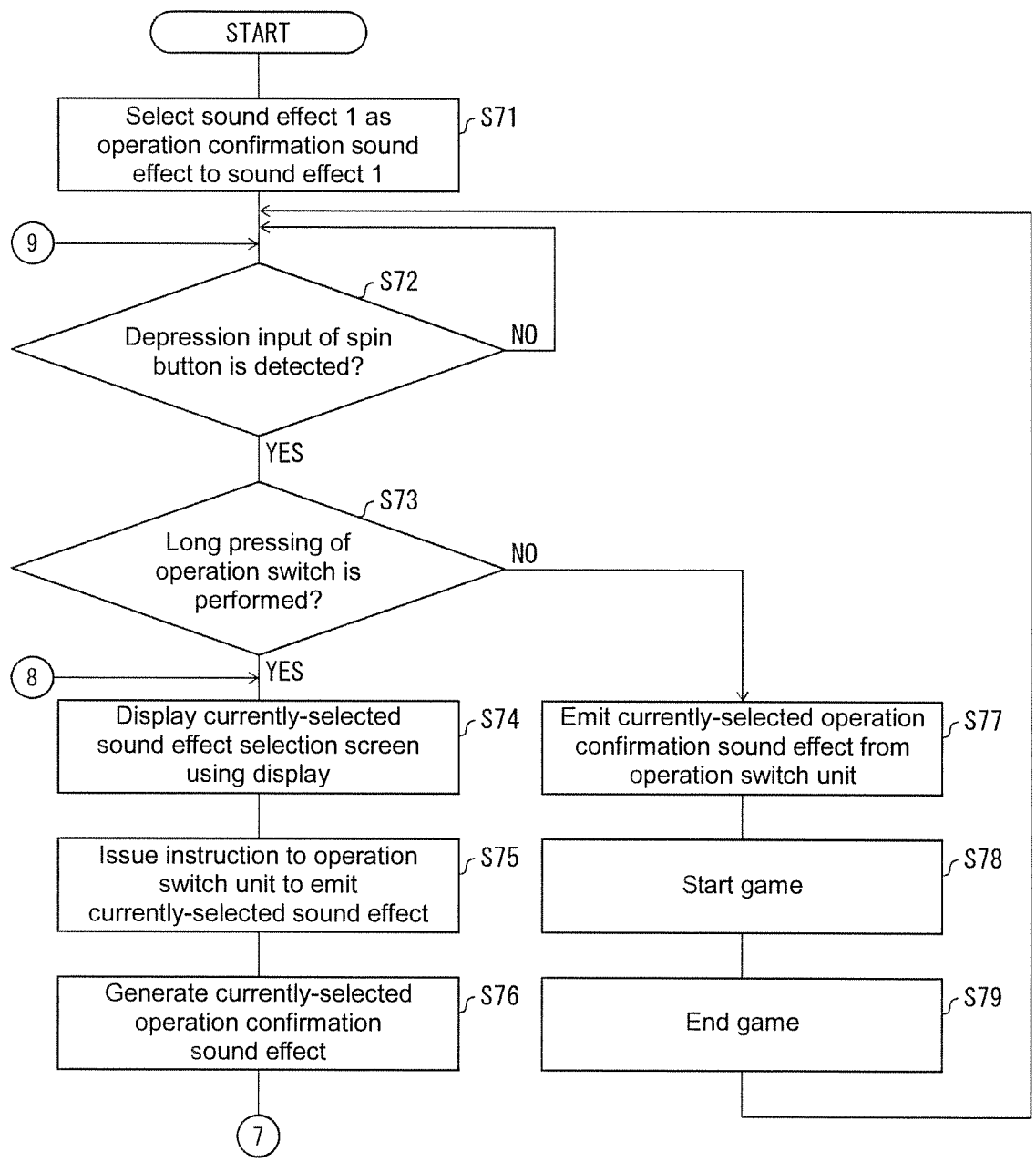
FIG. 21 is a flowchart illustrating a method for setting a sound effect by a bet button in the operation switch unit.

A method for setting the sound effect in the operation switch unit 10B will be described with reference to FIG. 21. FIG. 21 is a flowchart illustrating the sound effect setting method by the bet button in the operation switch unit 10B.

As illustrated in FIG. 21, an operation confirmation sound effect is set to the sound effect 1 as an initial value setting (S71). At this point, the sound effect 1 is a sound effect that can be generated without performing the setting with the bet buttons 18*a* to 18*j*, and is the sound effect that can be set by the bet button 18*a*.

The input detector 16*f* of the spin button 16B determines whether the depression part 16*b* of the spin button 16B is depressed (S72). When the determination that the depression part 16*b* of the spin button 16B is depressed is made in S71, the input detector 16*f* determines whether the long pressing of the depression part 16*b* of the spin button 16B is performed (S73). Whether the long pressing of the depression part 16*b* is performed is determined based on whether the input time of the depression part 16*b* is greater than or equal to, for example, 2 seconds.

When the determination that the long pressing of the depression part 16*b* is performed is made in S73, the liquid crystal display 16*e* of the spin button 16B in FIG. 20 displays the currently-selected sound effect (S74). The controller 19 performs the control such that the currently-selected sound effect is emitted from the directional speaker 14 (S75). Consequently, the selected sound effect is generated from the directional speaker 14 (S75).

Figure 22:
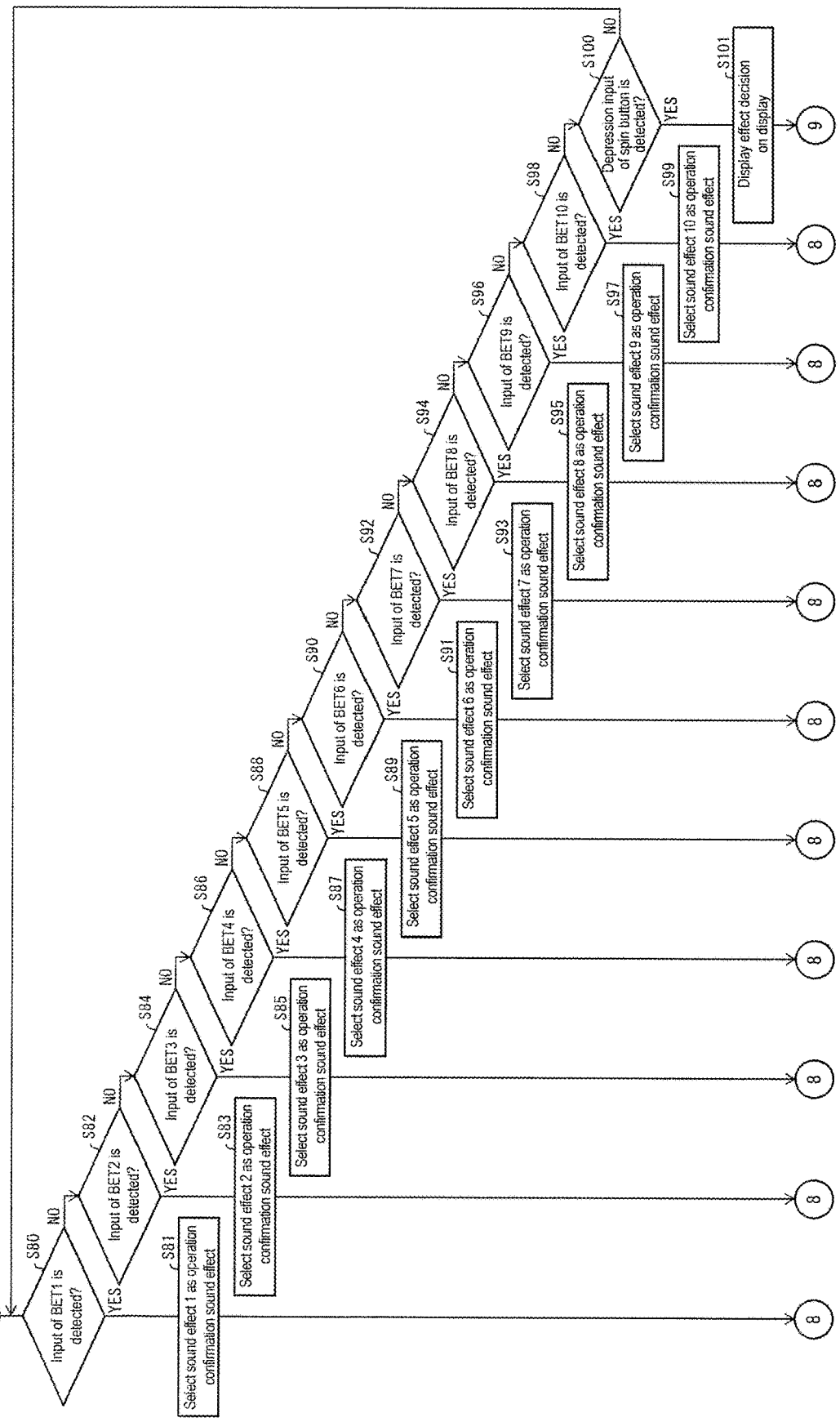
FIG. 22 is a flowchart illustrating a method for setting the sound effect by the bet button in the operation switch unit, and illustrating the continuation of FIG. 21.

A method for changing the sound effect to another sound effect will be described with reference to FIG. 22. FIG. 22 is a flowchart illustrating the sound effect changing method.

In the second embodiment, the bet buttons 18*a* to 18*j* are used in the case where the sound effect is changed. For this reason, in the bet buttons 18*a* to 18*j*, there are two modes of the operation confirmation section selecting mode in FIGS. 13 and 14 of the first embodiment and a sound effect setting mode of the second embodiment. In the sound effect setting mode of the second embodiment, the operation confirmation section selecting mode in FIGS. 13 and 14 of the first embodiment and the sound effect setting mode of the second embodiment can be switched by, for example, rotating the spin button casing 16*a* of the spin button 16B. For example, the rotation function of the spin button 16B can be used in volume adjustment of the directional speaker 14.

For this reason, after the spin button casing 16*a* of the spin button 16B is rotated to switch to the sound effect setting mode, the bet button input detector (not illustrated) determines whether the bet button 18*a* (described as "BET1" in FIG. 22) is inputted as illustrated in FIG. 22 (S80). When the determination that the bet button 18*a* (described as "BET1" in FIG. 22) is input is made in S80, the controller 19 selects the sound effect 1 as the operation confirmation sound effect.

In the second embodiment, the operation confirmation sound effect is set to the sound effect 1 in the initial setting of S71 in FIG. 21. Thus, in selecting the sound effect 1 by the bet button 18*a*, the sound effect 1 is selected from another operation confirmation sound effect in practice.

When determining that the bet button 18*a* (described as "BET1" in FIG. 22) is not inputted in S80, the bet button input detector (not illustrated) determines whether the bet button 18*b* (described as "BET2" in FIG. 22) is input (S82). When the determination that the bet button 18*b* (described as "BET2" in FIG. 22) is input is made in S82, the controller 19 selects the sound effect 2 as the operation confirmation sound effect.

Similarly, whether the bet buttons 18*c* to 18*j* (described as "BET3 to BET10" in FIG. 22) are input is determined in order, and the operation confirmation sound effect is set to the sound effects 3 to 10 (S84 to S99).

When the determination that the bet button 18*j* (described as "BET10" in FIG. 22) is not input is made in S98, whether the depression part 16*b* of the spin button 16B is depressed is determined (S100). When the determination that the depression part 16*b* of the spin button 16B is depressed is made in S100, an effect decision is displayed on the liquid crystal display 16*e* of the spin button 16B (S101). Then, the control action returns to S72 in FIG. 21.

When the determination that the depression part 16*b* of the spin button 16B is not depressed is made in S100, the control action returns to S80 to determine whether the bet button 18*a* (described as "BET1" in FIG. 22) is input.

In this way, in the case where the operation confirmation sound effect is set, the controller 19 causes the operation switch unit 10B to emit the currently-selected operation confirmation sound effect when the determination that the long pressing of the depression part 16*b* of the spin button 16B is not performed is made in S73 of FIG. 21. Specifically, the currently-selected operation confirmation sound effect is emitted from the directional speaker 14 (S77). Consequently, the game is started (S78), and the game is ended by displaying the reel (S78).

As described above, the operation switch unit 10B of the second embodiment includes the bet button 18 as the operation notification sound selector that selects the directional sound of the notification that the operation input is performed from a plurality of kinds of directional sounds. Consequently, the directional sound of the notification that the operation input is performed can be selected from the plurality of kinds of directional sounds using the bet button 18. As a result, since the operation notification sound can be set to a directional sound different from others, whether the operation notification sound is the own operation notification sound or the operation notification sound of another person can easily be distinguished.

In the operation switch unit 10B of the second embodiment, the spin button 16B includes the liquid crystal display 16*e* as the operation notification sound display that displays the selected operation notification sound.

Consequently, the selected operation notification sound is displayed on the liquid crystal display 16*e*, so that the operator can confirm the selected operation notification sound.

The liquid crystal display 16*e* is provided with the spin button 16B, so that the operator can confirm the selected operation notification sound by viewing the liquid crystal display 16*e* provided in the operation part used in the operation input. Thus, the operation switch unit 10B having convenience can be provided.

The present invention is not limited to the above embodiments, various changes can be made without departing from the scope of the claims, and an embodiment acquired by a combination of technical means disclosed in different embodiments is also included in the technical scope of the present invention.

The invention claimed is:

1. An operation switch unit attached to a game machine, the operation switch unit comprising:
   an operation part configured to receive an input operation of an operator;
   an input detector configured to detect that the input operation of the operator is performed; and
   a controller configured to control a notification part such that the notification part emits a directional sound to the operator based on a detection signal from the input detector, the notification part emitting the directional sound, which does not spread uniformly but has directionality, as a notification that an operation input is performed.

2. The operation switch unit according to claim 1, wherein the notification part issues an instruction to notify the operator that the operation input is performed by the directional sound using a directional speaker.

3. The operation switch unit according to claim 2, wherein
   the notification part is configured to notify the operator that the operation input is performed, by a method other than a method for notifying the operator by the directional sound,
   the operation switch unit further comprising a notification method selector configured to select whether to notify the operator by the directional sound, by a method other than the directional sound, or by both the directional sound and a method other than the directional sound.

4. The operation switch unit according to claim 2, wherein the notification part is provided in the operation part.

5. The operation switch unit according to claim 2, further comprising an operation notification sound selector that selects the directional sound of the notification that the operation input is performed from a plurality of kinds of directional sounds.

6. The operation switch unit according to claim 1, wherein
   the notification part is configured to notify the operator that the operation input is performed, by a method other than a method for notifying the operator by the directional sound,
   the operation switch unit further comprising a notification method selector configured to select whether to notify the operator by the directional sound, by a method other than the directional sound, or by both the directional sound and a method other than the directional sound.

7. The operation switch unit according to claim 6, further comprising a notification method display that displays a method selected by the notification method selector.

8. The operation switch unit according to claim 7, wherein the notification method display is provided in the operation part.

9. The operation switch unit according to claim 8, wherein the notification part is provided in the operation part.

10. The operation switch unit according to claim 8, further comprising an operation notification sound selector that selects the directional sound of the notification that the operation input is performed from a plurality of kinds of directional sounds.

11. The operation switch unit according to claim 7, wherein the notification part is provided in the operation part.

12. The operation switch unit according to claim 7, further comprising an operation notification sound selector that selects the directional sound of the notification that the operation input is performed from a plurality of kinds of directional sounds.

13. The operation switch unit according to claim 6, wherein the notification part is provided in the operation part.

14. The operation switch unit according to claim 6, further comprising an operation notification sound selector that selects the directional sound of the notification that the operation input is performed from a plurality of kinds of directional sounds.

15. The operation switch unit according to claim 1, wherein the notification part is provided in the operation part.

16. The operation switch unit according to claim 15, further comprising an operation notification sound selector that selects the directional sound of the notification that the operation input is performed from a plurality of kinds of directional sounds.

17. The operation switch unit according to claim 1, further comprising an operation notification sound selector that selects the directional sound of the notification that the operation input is performed from a plurality of kinds of directional sounds.

18. The operation switch unit according to claim 17, wherein the operation part includes an operation notification sound display that displays a selected operation notification sound.

19. A game machine comprising:
    the operation switch unit according to claim 1.

20. A game machine comprising:
    the operation switch unit according to claim 2.

* * * * *